(12) United States Patent
Shin et al.

(10) Patent No.: US 7,782,005 B2
(45) Date of Patent: Aug. 24, 2010

(54) POWER CONVERTER CONTROL

(75) Inventors: Kentaro Shin, Yokohama (JP); Kraison Throngnumchai, Yokohama (JP); Yasuaki Hayami, Yokosuka (JP); Toshihiro Kai, Yamato (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 386 days.

(21) Appl. No.: 11/861,593

(22) Filed: Sep. 26, 2007

(65) Prior Publication Data
US 2008/0106919 A1 May 8, 2008

(30) Foreign Application Priority Data
Nov. 7, 2006 (JP) .............................. 2006-301767
Jul. 11, 2007 (JP) .............................. 2007-182377

(51) Int. Cl.
G05B 1/02 (2006.01)
H03K 3/013 (2006.01)

(52) U.S. Cl. ..................... 318/632; 318/606; 318/807

(58) Field of Classification Search ................. 318/599, 318/606, 609, 610, 621, 632, 722, 723, 800, 318/801, 807–812; 363/123, 131, 157
See application file for complete search history.

(56) References Cited

U.S. PATENT DOCUMENTS

| 3,662,247 | A | * | 5/1972 | Schieman | 363/41 |
| 4,050,006 | A | * | 9/1977 | Stich | 363/98 |
| 4,320,331 | A | * | 3/1982 | Plunkett | 318/722 |
| 4,587,605 | A | | 5/1986 | Kouyama et al. | |
| 4,691,269 | A | | 9/1987 | Yamane et al. | |
| 4,851,982 | A | | 7/1989 | Tanahashi | |
| 4,905,135 | A | | 2/1990 | Unehara et al. | |
| 5,068,777 | A | | 11/1991 | Ito | |
| 5,155,675 | A | | 10/1992 | Maruyama et al. | |
| 5,422,557 | A | | 6/1995 | Lee et al. | |
| 5,467,262 | A | | 11/1995 | Nakata et al. | |
| 5,627,742 | A | | 5/1997 | Nakata et al. | |
| 5,781,423 | A | * | 7/1998 | Inarida et al. | 363/41 |
| 6,545,443 | B2 | * | 4/2003 | Kushida | 318/727 |
| 6,819,077 | B1 | * | 11/2004 | Seibel et al. | 318/801 |
| 7,042,741 | B2 | | 5/2006 | Tanaka et al. | |
| 7,102,903 | B2 | | 9/2006 | Nakamura et al. | |
| 7,282,682 | B2 | | 10/2007 | Suenaga et al. | |
| 7,542,312 | B2 | | 6/2009 | Meguro et al. | |
| 7,567,048 | B2 | * | 7/2009 | Shin et al. | 318/400.24 |
| 2006/0192520 | A1 | | 8/2006 | Yin et al. | |

(Continued)

FOREIGN PATENT DOCUMENTS

JP 03-218270 9/1991

(Continued)

Primary Examiner—Bentsu Ro
(74) Attorney, Agent, or Firm—Young Basile

(57) ABSTRACT

In a power converter including an inverter configured to convert a direct current voltage into an alternating current voltage by controlling switching devices to be turned ON or OFF based on a control signal and to output the alternating current voltage to a load, a carrier wave frequency is changed. A command value is compensated in accordance with the changing carrier wave frequency. The control signal results from a comparison of the carrier wave with a compensated command value. As a result of the compensation, output fluctuations caused by an error voltage between the command value and an output voltage to the load can be suppressed.

19 Claims, 23 Drawing Sheets

U.S. PATENT DOCUMENTS

2006/0221656 A1  10/2006  Meguro et al.
2007/0237218 A1* 10/2007  Walker ....................... 375/229
2007/0247881 A1  10/2007  Hayami et al.
2007/0252625 A1  11/2007  Shin et al.
2008/0089102 A1   4/2008  Hayami et al.

FOREIGN PATENT DOCUMENTS

JP   07-099795      11/1995
JP   2002-095262 A   3/2002
JP   2006-136138     5/2006

* cited by examiner

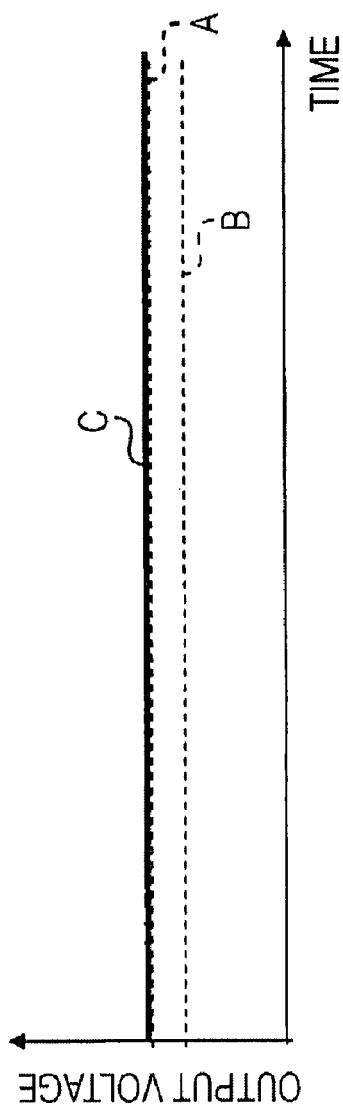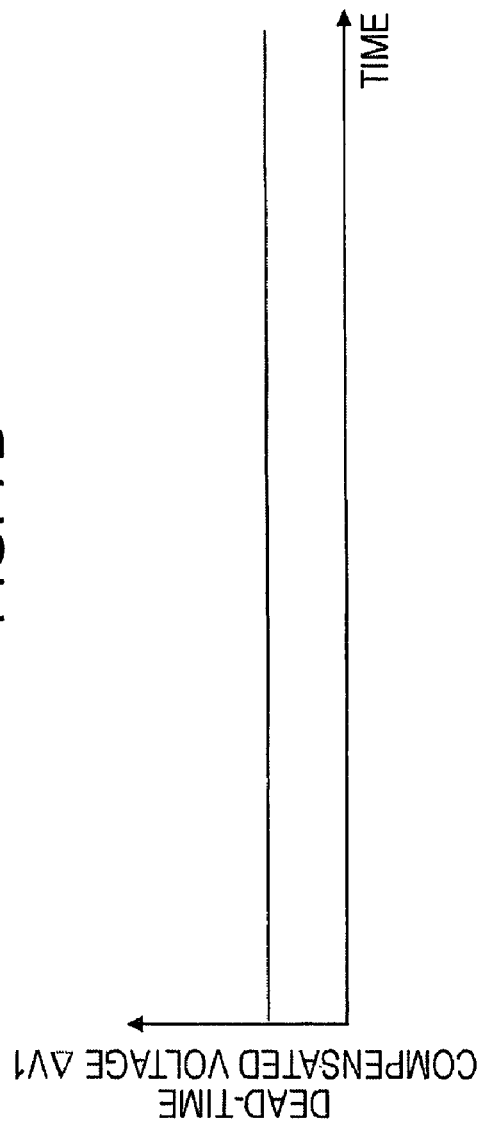

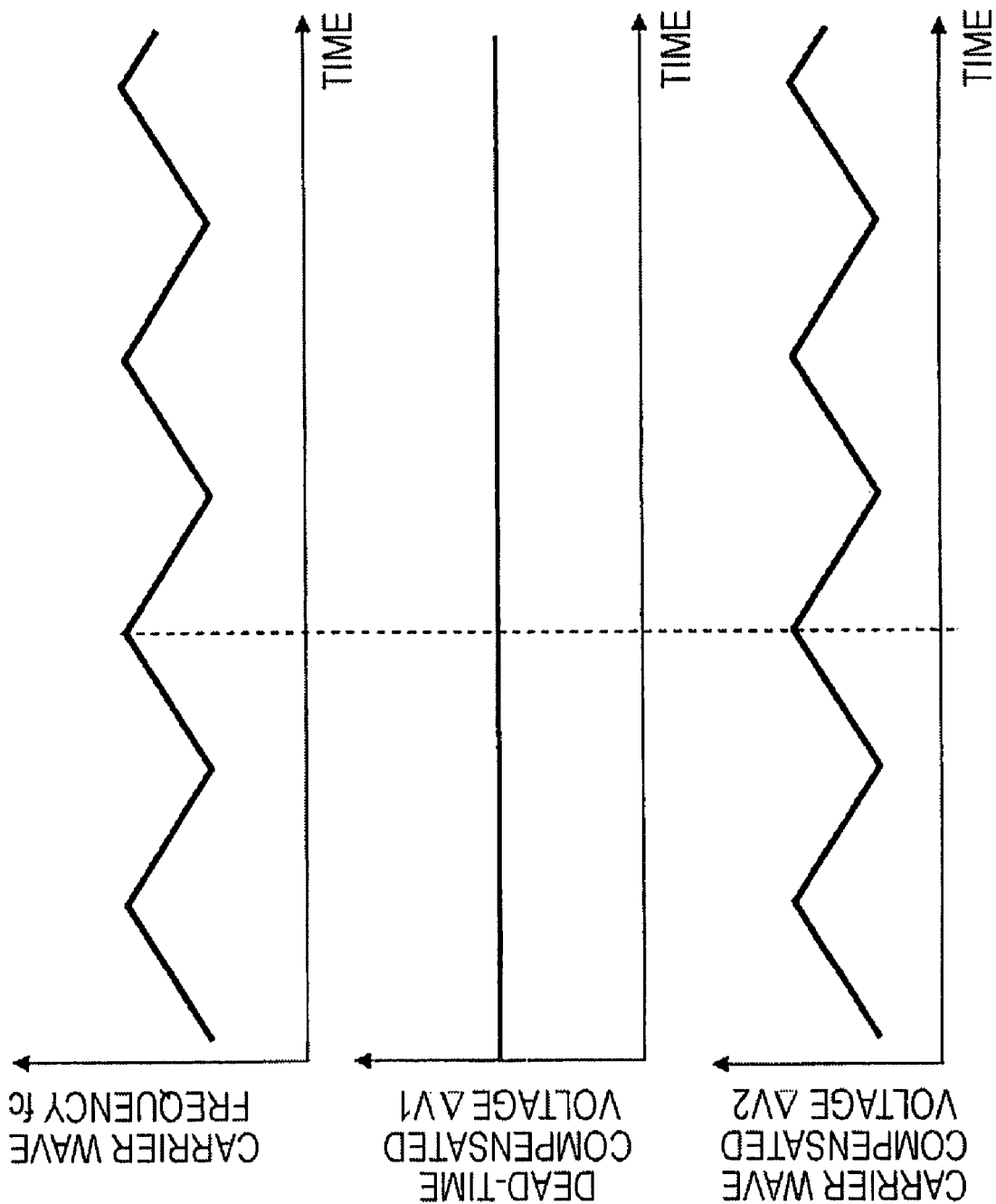

POWER CONVERTER CONTROL

CROSS-REFERENCE TO RELATED APPLICATION

This application claims priority from Japanese Patent Application Serial Nos. 2006-301767, filed Nov. 7, 2006, and 2007-182377, filed Jul. 11, 2007, each of which is incorporated herein in its entirety by reference.

TECHNICAL FIELD

The invention relates generally to power converter control for converting an output from a direct current (DC) power supply into alternating current (AC) power and for supplying the converted AC power to loads.

BACKGROUND

The base unit of a power converter for converting DC power into three-phase AC power is an arm including series-connected upper and lower switching devices, and the upper and lower switching devices are alternately turned ON and OFF.

In known power converters, to prevent short-circuiting of the upper and lower switching devices by the devices being simultaneously turned ON, a short-circuit prevention time (also referred to as a "dead time") for which the upper and lower switching devices are simultaneously turned OFF when they are switched from the ON state to the OFF state and vice versa is provided.

However, because of the provision of this dead time, an error may occur between a voltage command value output from a control unit and an actual output voltage (hereinafter such an error is referred to as an "error voltage"), which may cause distortion in the output voltage. Accordingly, a compensation voltage, which is a constant value, is added to a voltage command value so that an error voltage can be compensated for. Such a technique is disclosed in, for example, Japanese Unexamined Patent Application Publication No. 2002-95262.

BRIEF SUMMARY

Taught herein are improvements to control of a power converter. According to one power converter taught herein that includes an inverter configured to convert a direct current voltage into an alternating current voltage by controlling switching devices to be turned ON or OFF based on a control signal and to output the alternating current voltage to a load, a power converter control unit comprises a command value output unit configured to output the command value, a carrier wave output unit configured to output a carrier wave, a frequency changing unit configured to change a frequency of the carrier wave, a compensator configured to compensate the command value in accordance with a change in the frequency of the carrier wave changed by the frequency changing unit and to output a command value signal and a control signal generator configured to compare the command value signal with the carrier wave and to generate the control signal based on a comparison result.

According to another control unit therefor, the control unit comprises means for outputting a command value, means for outputting a carrier wave, means for changing a frequency of the carrier wave, means for compensating the command value in accordance with a change in the frequency of the carrier wave and for outputting a command value signal and means for comparing the command value signal with the carrier wave to generate the control signal.

Power conversion methods for a power converter are also taught herein. One such power conversion method comprises comparing a frequency of a carrier wave changing over time with a command value compensated in accordance with a change in the frequency of the carrier wave, converting a direct current voltage into an alternating current voltage by controlling switching devices to be turned ON and OFF based on a control signal generated based on a result of the comparing, and outputting the alternative current voltage.

BRIEF DESCRIPTION OF DRAWINGS

The description herein makes reference to the accompanying drawings wherein like reference numerals refer to like parts throughout the several views, and wherein:

FIGS. 7A and 7B illustrate an output voltage and a dead-time compensated voltage, respectively, when the carrier wave frequency is constant;

FIGS. 9A, 9B and 9C illustrate a carrier wave frequency, a dead-time compensated voltage and a carrier wave corrected voltage, respectively, of the dead-time compensator shown in FIG. 4;

DETAILED DESCRIPTION OF EMBODIMENTS OF THE INVENTION

In known power converters in which a carrier wave frequency is changed, if the technique of adding a compensation voltage to the command value so that an error voltage can be compensated for is applied, an error voltage cannot be sufficiently compensated. Ripples appear in a current to be supplied to a load, causing fluctuations in the output of the load.

In contrast, according to certain teachings herein a command value is compensated in response to a change in the frequency of a carrier wave. With this configuration, output fluctuations caused by error voltages can be suppressed.

Power converters configured in accordance with first through fifth embodiments of the invention are described below with reference to FIGS. 1 through 23.

A power converter configured in accordance with a first embodiment of the invention is described below with reference to FIGS. 1 through 10.

Figure 1:
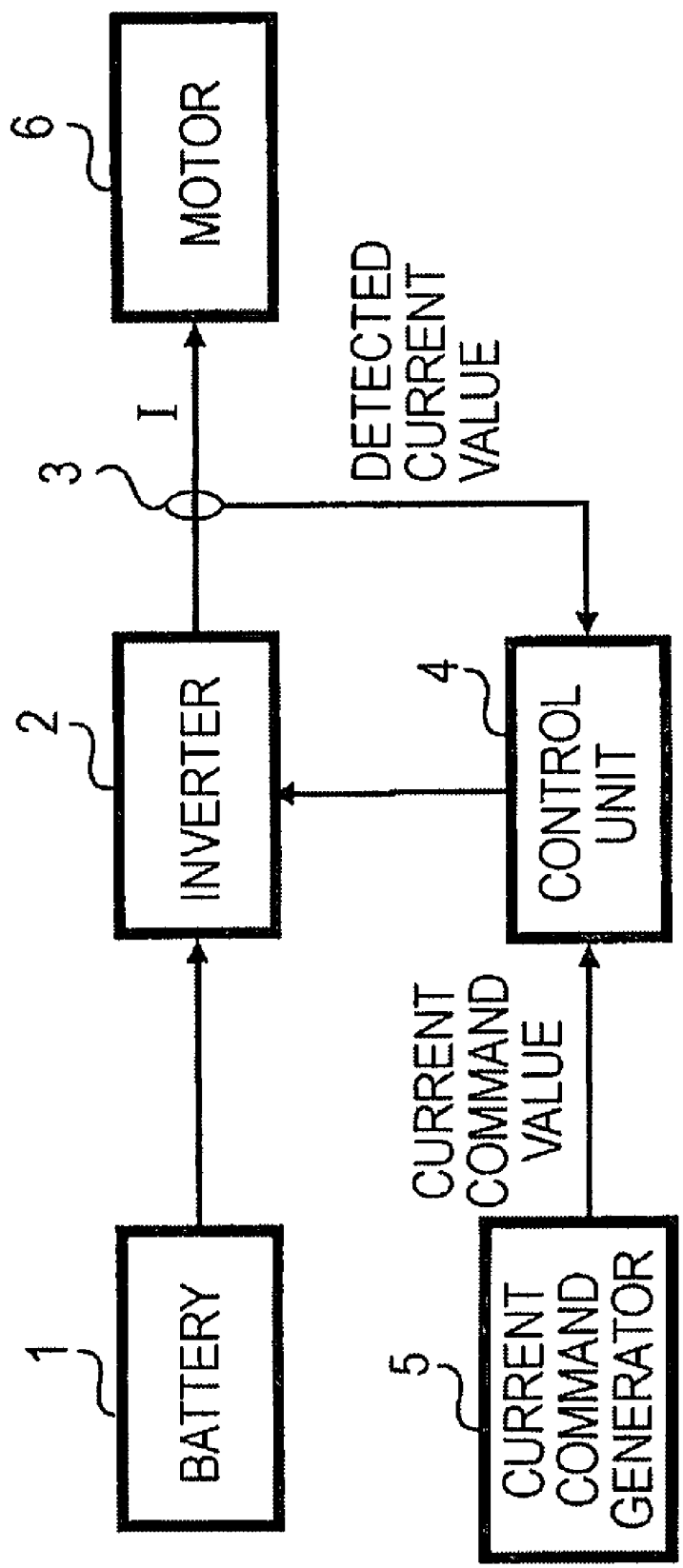
FIG. 1 is a block diagram illustrating a power converter configured in accordance with a first embodiment of the invention.

The power converter shown in FIG. 1 includes a DC-power chargeable/dischargeable battery (DC power) 1, an inverter 2 that converts DC power stored in the battery 1 into AC power and outputs the converted AC power to a motor 6, a current detector 3 that detects an output current I of the AC power output from the inverter 2 to the motor 6 as a detected current value, and a control unit 4 that controls the inverter 2 based on the detected current value detected by the current detector 3 and a current command value output from a current command generator 5.

In the power converter shown in FIG. 1, although the control unit 4 and the current command generator 5 are separately shown, they may be integrated into one controller. In FIG. 1, they are shown as different elements for the sake of description. In addition, the control unit 4 and/or the current command generator 5 can be, for example, a microcomputer including a random access memory (RAM), a read-only memory (ROM) and a central processing unit (CPU) in addition to various input and output connections. Generally the functions described herein for these components are performed by execution by the CPU of one or more programs stored in ROM. The parts of the control unit 4 and current command generator 5 shown in the figures and described below represent functional components of the one or more programs. Of course, some or all of the functions described can also be implemented in whole or in part by hardware.

Figure 2:
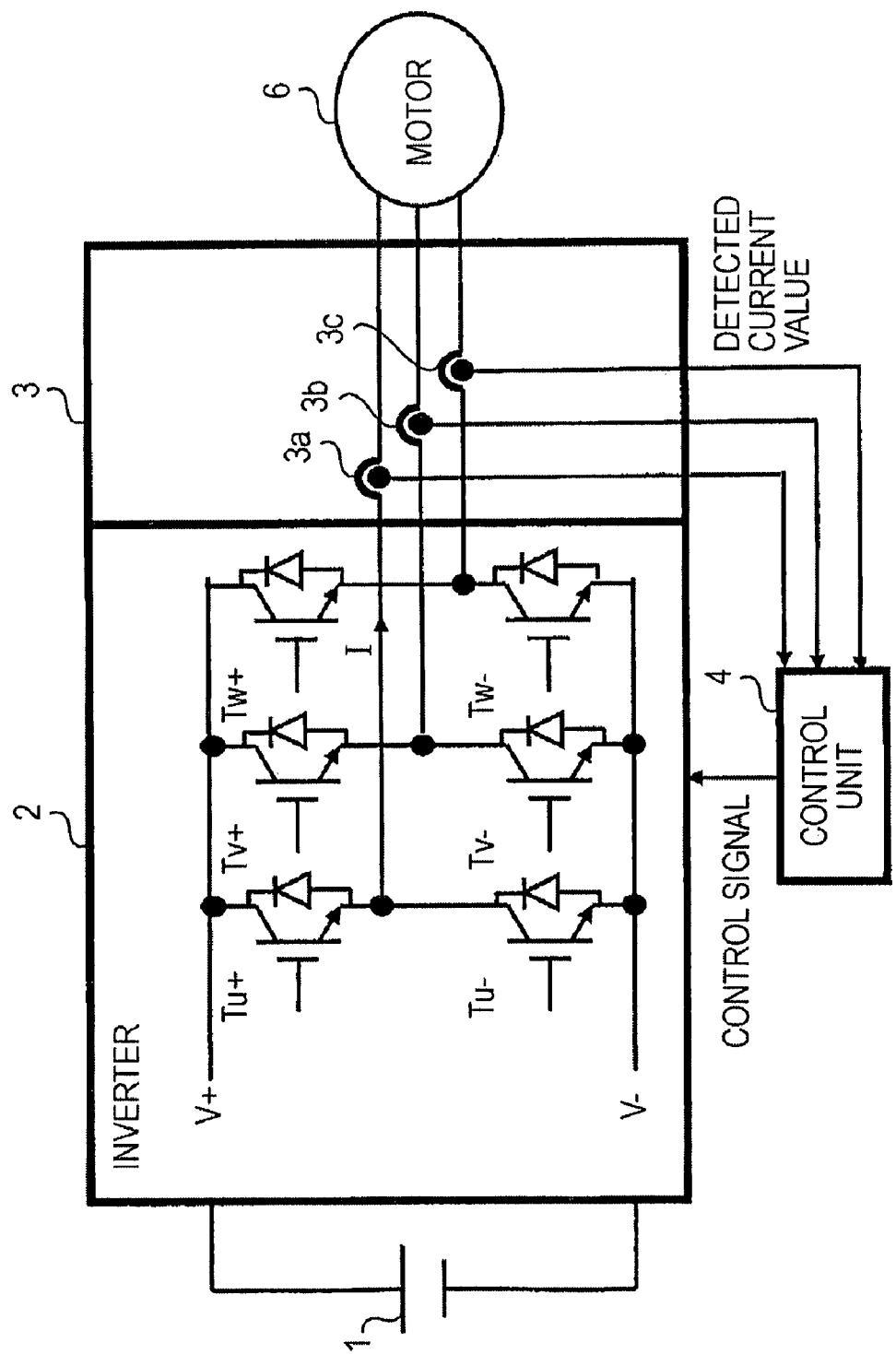
FIG. 2 illustrates an inverter shown in FIG. 1.

DC voltages V+ and V− are supplied, as shown in FIG. 2, from the battery 1 to the inverter 2. The inverter 2 includes six transistors Tu+, Tu−, Tv+, Tv−, Tw+ and Tw− and six diodes, each diode and the corresponding transistor forming a parallel circuit. The transistors Tu+, Tu−, Tv+, Tv−, Tw+ and Tw− are formed by semiconductor devices, such as insulated gate bipolar transistors (IGBTs).

The current detector 3 includes three current sensors 3a, 3b and 3c that detect output currents Iu, Iv and Iw having u, v and w phases, respectively, output from the inverter 2 as detected current values. The current detector 3 outputs the detected current values to the control unit 4. The current sensors 3a, 3b and 3c are hereinafter simply referred to as the "current detector 3" unless they have to be distinguished from each other.

Figure 3:
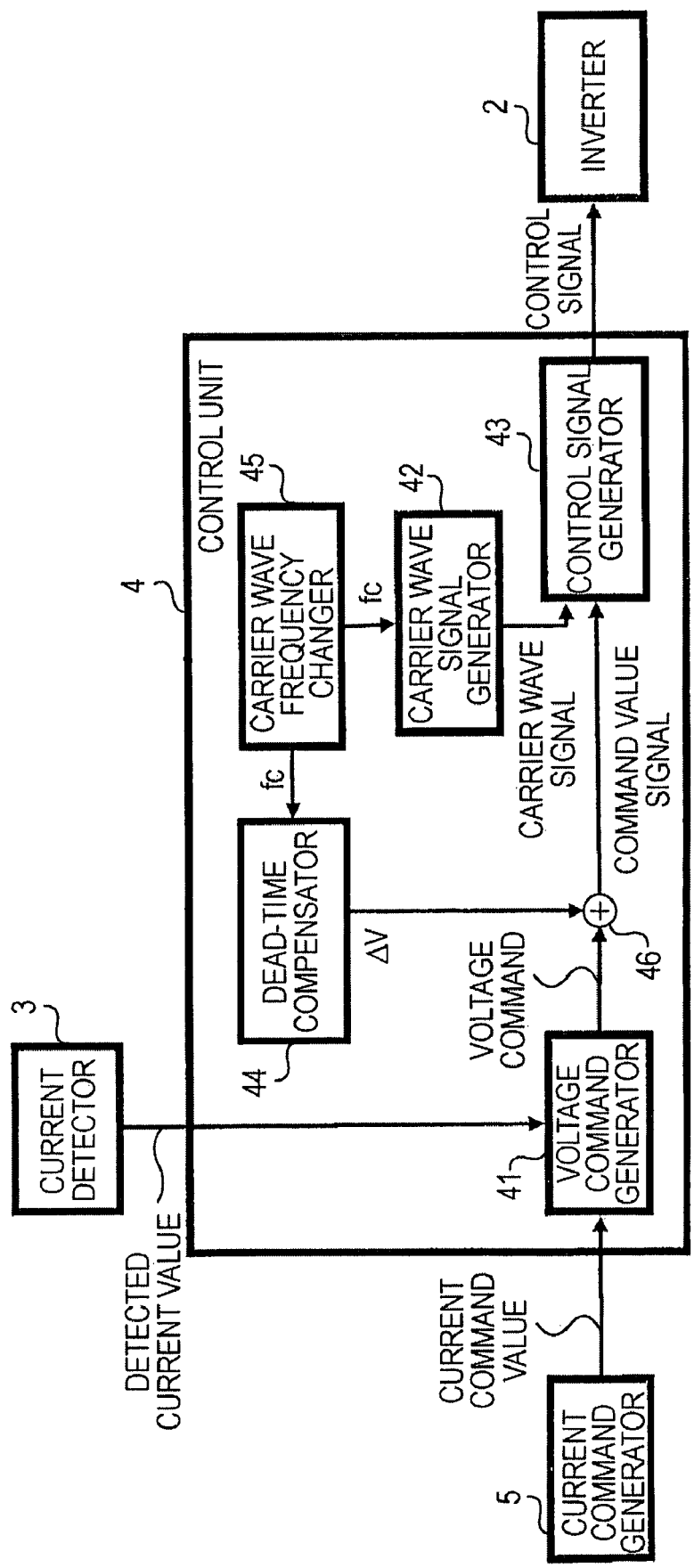
FIG. 3 is a block diagram illustrating a control unit shown in FIG. 1.

The control unit 4 includes, as shown in FIG. 3, the following elements. A voltage command generator 41 generates a voltage command based on a current command value output from the current command generator 5 and a detected current value output from the current detector 3. A carrier wave signal generator 42 generates a carrier wave signal. A dead-time compensator 44 outputs a dead-time compensation corrected voltage V, which is described below. An adder 46 adds the dead-time compensation corrected voltage V to the voltage command to generate a command value signal. A control signal generator 43 compares (e.g., using PWM comparison) the command value signal with the carrier wave signal and generates a control signal for turning ON or OFF the transistors of the inverter 2. A carrier wave frequency changer, or generator, 45 changes the frequency fc of the carrier wave signal.

The carrier wave signal generator 42 performs frequency modulation on the carrier wave signal on the basis of the carrier wave frequency fc output from the carrier wave frequency changer 45 and outputs the resulting carrier wave signal.

The control signal generator 43 compares the command value signal output from the adder 46 with the carrier wave signal by the use of a comparator to generate a pulsating control signal. The control signal generator 43 then outputs this control signal to the inverter 2.

Figure 4:
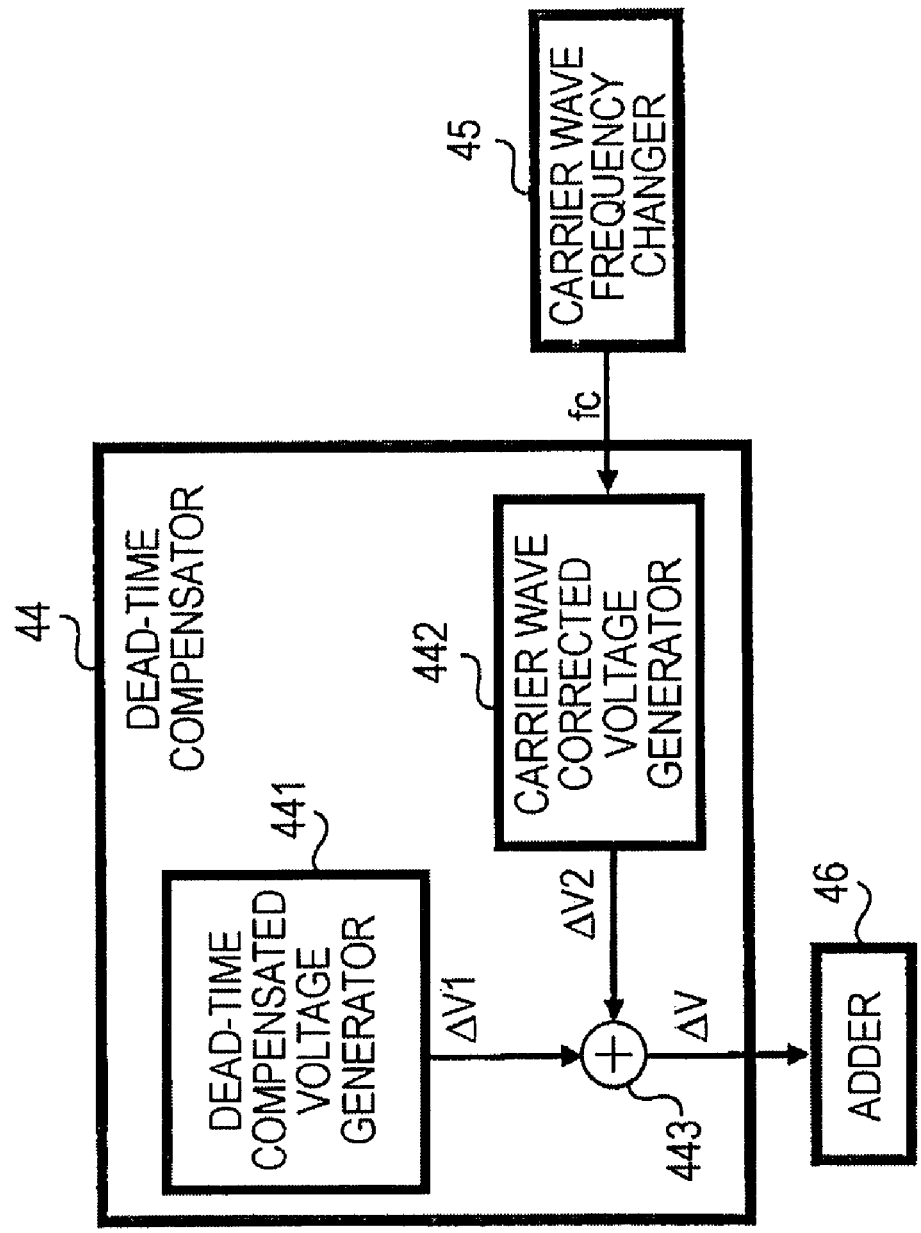
FIG. 4 is a block diagram illustrating a dead-time compensator shown in FIG. 3.

The dead-time compensator 44 includes, as shown in FIG. 4, the following elements. A dead-time compensated voltage generator 441 generates a dead-time compensated voltage $\Delta V1$, which is a constant voltage. A carrier wave corrected voltage generator 442 generates a carrier wave corrected voltage $\Delta V2$ in synchronization with the carrier wave frequency fc output from the carrier wave frequency changer 45. That is, the frequency of the carrier wave corrected voltage $\Delta V2$ and that of the carrier wave frequency fc coincide. An adder 443 adds the carrier wave corrected voltage $\Delta V2$ to the dead-time compensated voltage $\Delta V1$ and outputs the resulting dead-time compensation corrected voltage $\Delta V$ to the adder 46.

Figure 5:
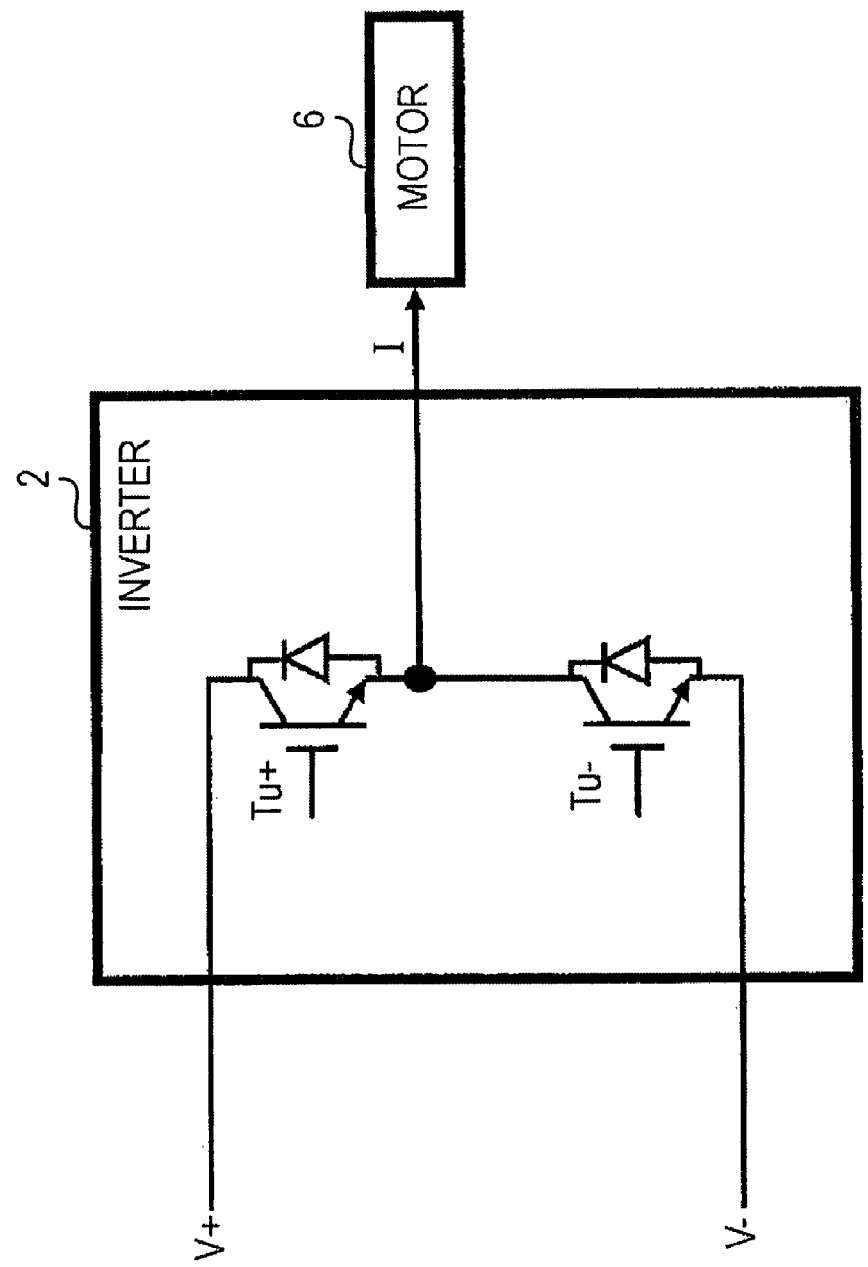
FIG. 5 illustrates the inverter shown in FIG. 2 in a simplified form.

The reason for providing the dead-time compensator 44 in the control unit 4 is discussed below with reference to FIGS. 5 through 7. FIG. 5 illustrates the inverter 2 in a simplified form. As stated above, the battery 1 supplies the DC voltages V+ and V− to the inverter 2. A control signal generated by the control signal generator 43 (see FIG. 3) is input into the gate terminals of the transistors Tu+ and Tu−.

The control signal is an ON/OFF pulse signal generated by the control signal generator 43 based on a result of comparing (e.g., by PWM comparison) the command value signal with the carrier wave signal by the control signal generator 43. Based on this control signal, the transistors Tu+ and Tu− are turned ON or OFF to allow power to be supplied from the inverter 2 to the motor 6.

Figure 6A:
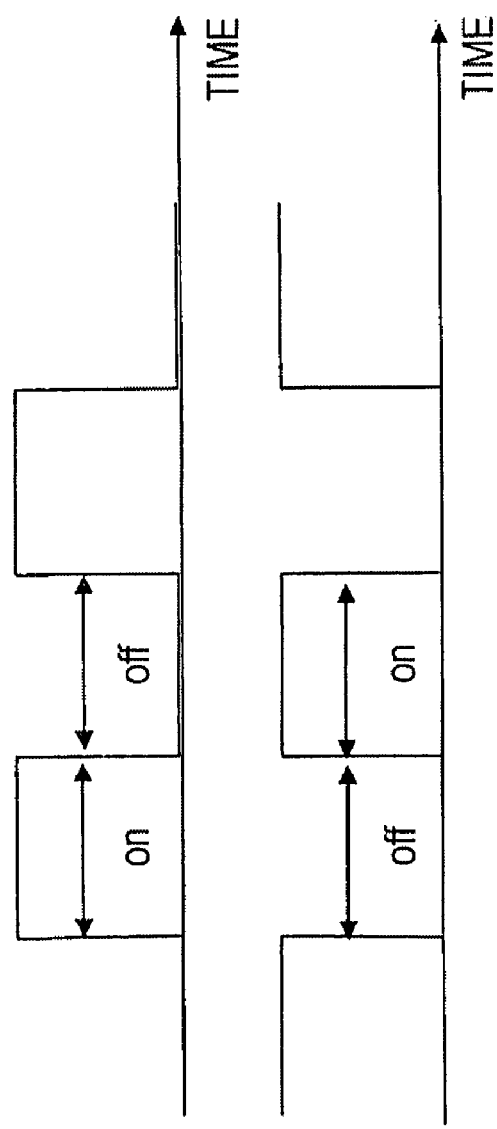
FIGS. 6A and 6B are time charts illustrating control signals input into transistors shown in FIG. 5.
Figure 6B:
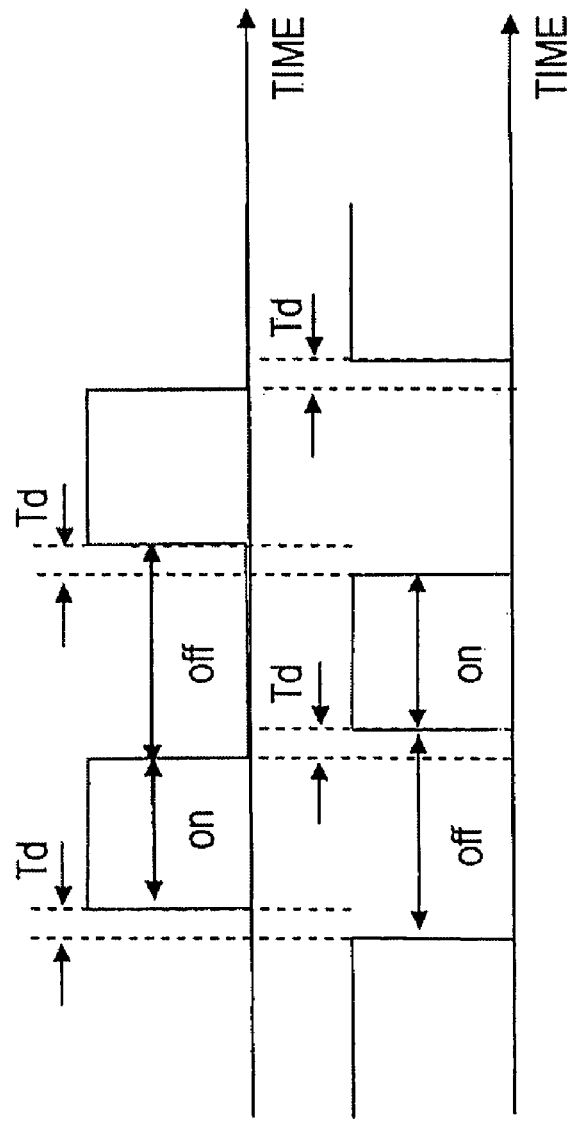

FIGS. 6A and 6B are time charts illustrating control signals input into the gate terminals of the transistors Tu+ and Tu− shown in FIG. 5. FIG. 6A is a time chart illustrating a control signal input into the gate terminals of the ideal transistors Tu+ and Tu− assuming that there is no delay. However, the actual transistors Tu+ and Tu− have a delay. Accordingly, if the transistors Tu+ and Tu− are turned ON or OFF, as shown in FIG. 6A, they may be simultaneously turned ON when they are switched from the ON state to the OFF state and vice versa.

If transistors Tu+ and Tu− are simultaneously turned ON, the power supply is short-circuited, which may destroy the transistors Tu+ and Tu−. To prevent such a short-circuit state, the times at which the transistors Tu+ and Tu− are turned ON are delayed as shown in FIG. 6B from the times shown in FIG. 6A by several µseconds, thereby preventing the transistors Tu+ and Tu− from being simultaneously turned ON. The time delay on the order of several µseconds is set to be the dead time Td, which is a short-circuit prevention time.

During the dead time Td, since both the transistors Tu+ and Tu− are turned OFF, the output voltage of the inverter 2 is in an uncontrollable state, and accordingly, the voltage output from the inverter 2 results in the voltage determined only by the direction of the output current I. Thus, the output voltage of the inverter 2 during the dead time Td acts as an error voltage. To set a command value by taking the error voltage into consideration to eliminate the error voltage, the dead-time compensated voltage generator 441 is provided for the dead-time compensator 44.

FIGS. 7A and 7B illustrate output voltages and dead-time compensated voltage ΔV1, respectively, when the carrier wave frequency fc is constant. More specifically, FIG. 7A illustrates the output voltage for one cycle of a carrier wave signal when the dead time Td was provided and dead-time compensation was performed, and when the dead time Td was provided and dead-time compensation was not performed. In FIG. 7A, line A represents the command value, line B designates the output voltage when dead-time compensation was not performed, and line C indicates the output voltage when dead-time compensation was performed. FIG. 7B illustrates the dead-time compensated voltage ΔV1 when dead-time compensation was performed. It should be noted that the dead-time compensated voltage. ΔV1 is constant.

FIG. 7A shows that the output voltage when dead-time compensation was not performed is lower than the command value and that the output voltage when dead-time compensation was performed is substantially equal to the command value.

If however, the carrier wave frequency fc is changed over time, ripples appear in the output current I of the inverter 2 even if dead-time compensation is performed. In particular, if the motor 6 is operated at low speed with a light load, the output of the motor 6 becomes more fluctuating and the operation of the motor 6 becomes less regular due to the occurrence of ripples. Accordingly, in the first embodiment, a further correction is made to the dead-time compensated voltage ΔV1 shown in FIG. 7B to suppress the occurrence of ripples and the output fluctuations and operation irregularities of a load caused by the occurrence of ripples.

Figure 8A:
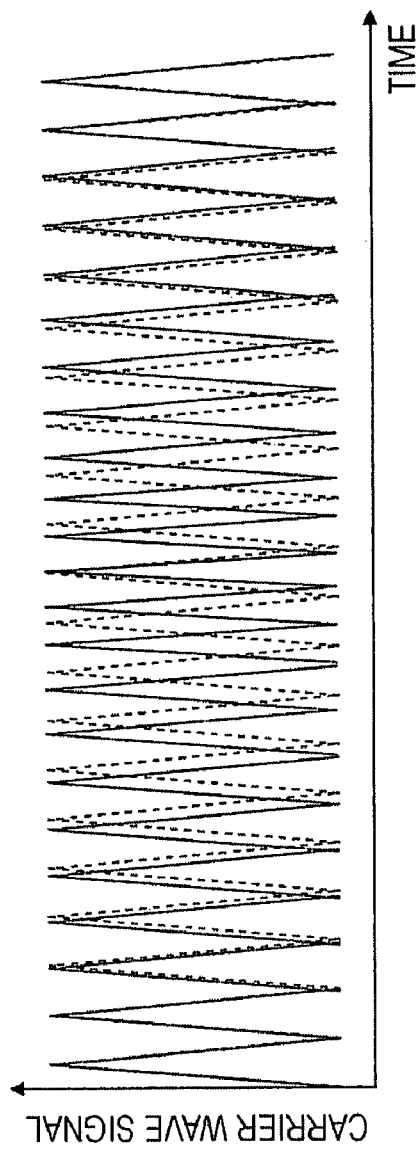
FIGS. 8A and 8B illustrate a carrier wave signal output from a carrier wave signal generator shown in FIG. 3 and a carrier wave frequency of the carrier wave signal, respectively.
Figure 8B:
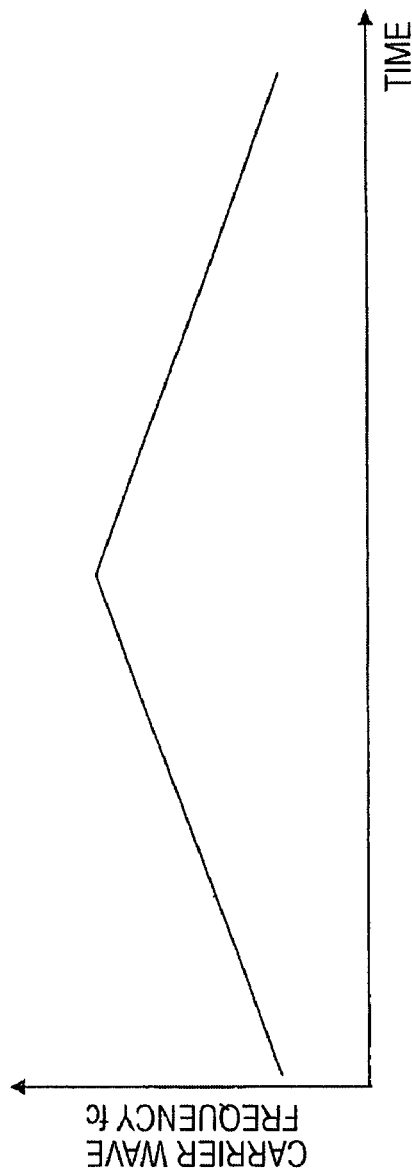

FIGS. 8A and 8B illustrate carrier wave signals output from the carrier wave signal generator 42 and carrier wave frequency fc output from the carrier wave frequency generator 45, respectively (see FIG. 3). FIG. 8A illustrates a carrier wave signal indicated by the broken lines when the carrier wave frequency fc is constant and a carrier wave signal indicated by the solid lines when the carrier wave frequency fc is changed over time. FIG. 8B illustrates a temporal change in the carrier wave frequency fc of the carrier wave signal indicated by the solid lines in FIG. 8A. It should be noted that FIGS. 8A and 8B illustrate the waveforms for one cycle of the carrier wave frequency fc.

Regarding FIGS. 9A, 9B, and 9C, FIG. 9A illustrates a temporal change in the carrier wave frequency fc output from the carrier wave frequency changer 45 of FIG. 3. FIG. 9B illustrates the constant dead-time compensated voltage ΔV1 generated from the dead-time compensated voltage generator 441, and FIG. 9C illustrates the carrier wave corrected voltage ΔV2 generated from the carrier wave corrected voltage generator 442 (see FIG. 4). The carrier wave corrected voltage ΔV2 is synchronized, as shown in FIG. 9C, with the carrier wave frequency fc output from the carrier wave frequency changer 45. The dead-time compensated voltage ΔV1, the carrier wave corrected voltage ΔV2 and the dead-time compensation corrected voltage ΔV(t) are expressed by the following equations (1), (2) and (3), respectively:

$$\Delta V1 = fa \times Td \times Vdc;\quad(1)$$

$$\Delta V2(t) = \{fc(t) - fa\} \times Td \times Vdc;\text{ and}\quad(2)$$

$$\Delta V(t) = \Delta V1 + \Delta V2(t) = fc(t) \times Td \times Vdc;\text{ wherein}\quad(3)$$

fc(t) indicates the carrier wave frequency;

Vdc represents the power supply voltage; and fa designates the average of the carrier wave frequencies fc(t).

The dead-time compensation corrected voltage ΔV(t), which is the output from the adder 443 as a result of adding the carrier wave corrected voltage ΔV2 output from the carrier wave corrected voltage generator 442 to the dead-time compensated voltage ΔV1 from the dead-time compensated voltage generator 441, is the output signal from the dead-time-compensator 44.

That is, the dead-time compensation corrected voltage ΔV(t) is proportional to the carrier wave frequency fc(t). Accordingly, even if the carrier wave frequency fc(t) is changed over time, the dead-time compensator 44 can output the dead-time compensation corrected voltage ΔV(t) in accordance with a temporal change in the carrier wave frequency fc(t).

Figure 10:
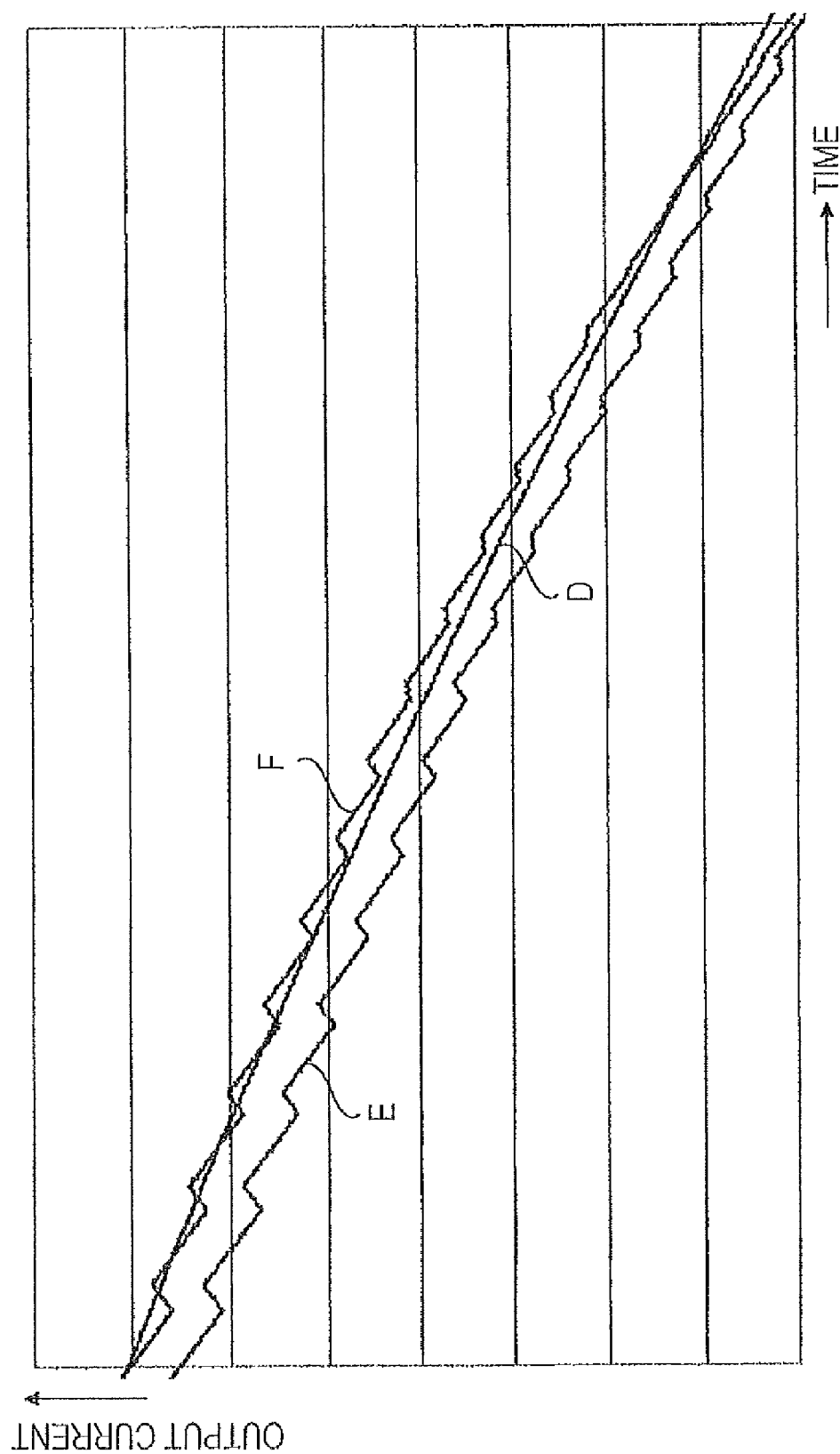
FIG. 10 illustrates the waveforms of output currents supplied from the inverter shown in FIG. 2.

FIG. 10 illustrates the waveforms of the output current I output from the inverter 2 shown in FIG. 2. The waveform D indicates the ideal output current waveform based on the command value. The waveform E represents the output current waveform when the carrier wave frequency fc is changed over time and when the dead-time compensation corrected voltage ΔV is set to be the dead-time compensated voltage ΔV1 which is a constant voltage. The waveform F designates the output current waveform when the dead-time compensation corrected voltage ΔV is changed in accordance with a temporal change in the carrier wave frequency fc. Upon comparing the error between the waveform D and the waveform E with the error between the waveform D and the waveform F, the latter is smaller than the former by about 10%. Additionally, the magnitude of the ripples of the waveform F is smaller than that of the waveform E.

As discussed above, the adder 443 adds the carrier wave corrected voltage ΔV2, which is synchronized with the carrier wave frequency fc that changes over time and is generated from the carrier wave corrected voltage generator 442, to the dead-time compensated voltage ΔV1 generated from the dead-time compensated voltage generator 441. Then, the resulting dead-time compensation corrected voltage ΔV(t) is output from the dead-time compensator 44. The adder 46 adds the dead-time compensation corrected voltage ΔV(t) to the command voltage output from the command voltage generator 41, and the resulting command value signal is output to the control signal generator 43. The control signal generator 43 compares the command value signal with the carrier wave signal output from the carrier wave signal generator 42 to generate a control signal. This control signal is output to the gate terminals of the transistors Tu+, Tu−, Tv+, Tv−, Tw+ and Tw− of the inverter 2. Thus, even if the carrier wave frequency fc is changed over time; the occurrence of ripples and the output fluctuations and operation irregularities of a load caused by the occurrence of ripples can be suppressed while inhibiting the occurrence of error voltages.

Additionally, by changing the dead-time compensation corrected voltage ΔV in response to a temporal change in the carrier wave frequency fc, errors of the actual output current I supplied from the inverter 2 to the motor 6 deviated from the ideal output current I reflecting the command value can be reduced. Also, changing the carrier wave frequency fc can reduce switching noise having spectral components exhibiting a high noise level for the carrier wave frequency fc and n-order higher harmonic frequencies of the carrier wave frequency fc.

A power converter configured in accordance with a second embodiment of the invention is described below with reference to FIGS. 11 through 13E. In the second embodiment, elements similar to those in the first embodiment are designated with like reference numerals.

The power converter of the second embodiment is different from the counterpart of the first embodiment in the dead-time compensator of the control unit. Details of the configuration of the dead-time compensator in the second embodiment are given below.

Figure 11:
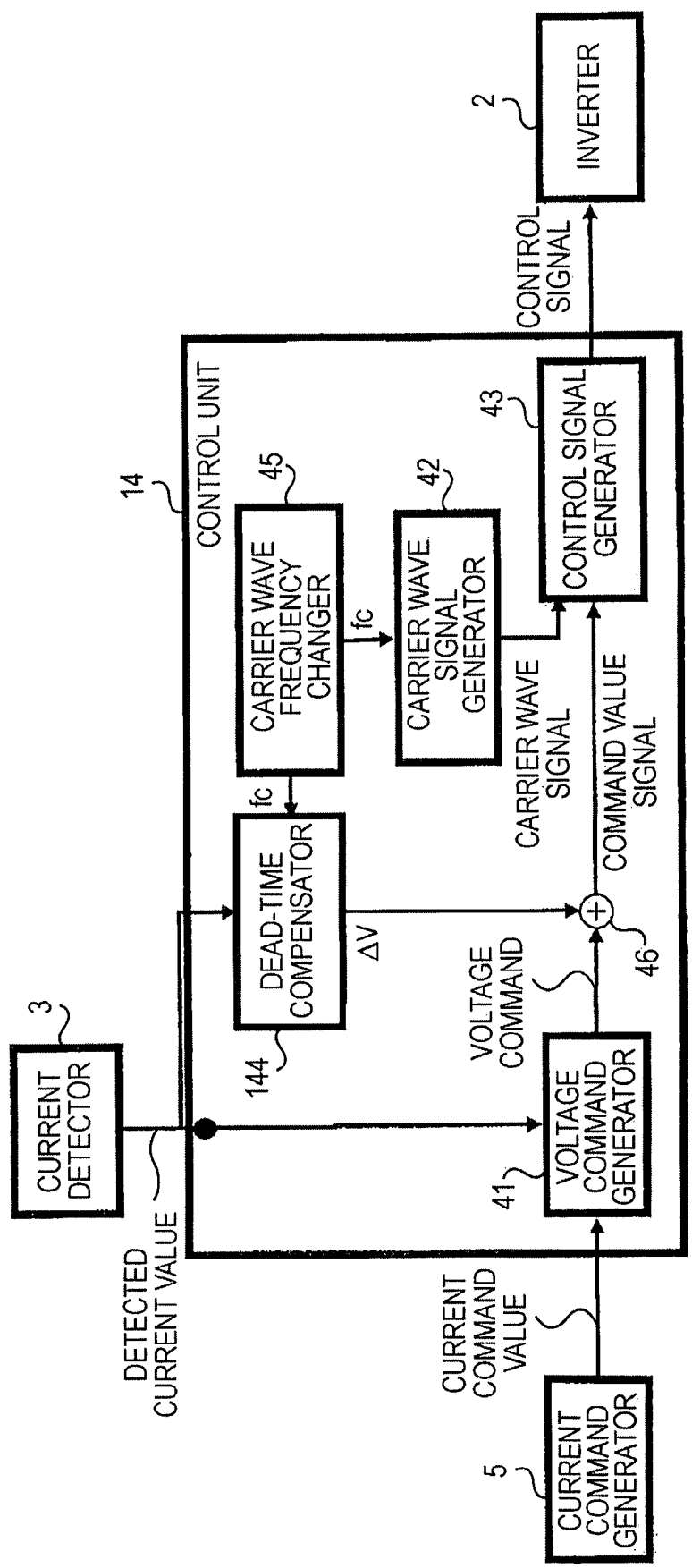
FIG. 11 is a block diagram illustrating a control unit of a power converter configured in accordance with a second embodiment of the invention.

FIG. 11 illustrates a control unit 14 of the power converter of the second embodiment. The control unit 14 includes a voltage command generator 41 that generates a voltage command based on a current command value output from the current command generator 5 and a detected current value output from the current detector 3. A carrier wave signal generator 42 generates a carrier wave signal. A dead-time compensator 144 outputs a dead-time compensation corrected voltage ΔV. An adder 46 adds the dead-time compensation corrected voltage ΔV to the voltage command to generate a command value signal. A control signal generator 43 compares (e.g., through PWM comparison) the command value signal with the carrier wave signal and generates a control signal for turning ON or OFF the transistors of the inverter 2. A carrier wave frequency changes 45 changes the frequency fc of the carrier wave signal. Unlike the first embodiment, the detected current value output from the current detector 3 is supplied not only to the voltage command generator 41 but also to the dead-time compensator 144.

Figure 12:
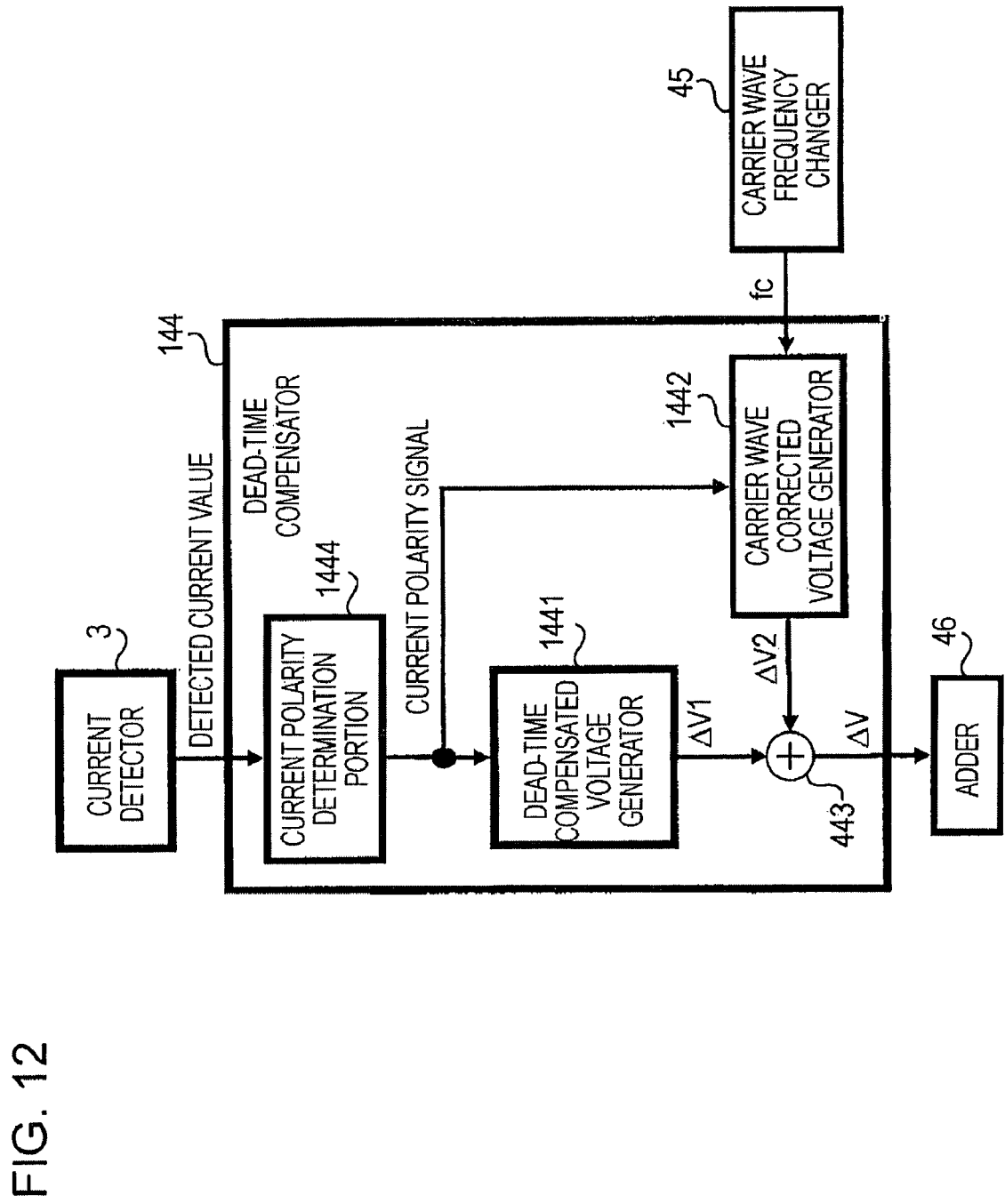
FIG. 12 is a block diagram illustrating a dead-time compensator shown in FIG. 11.

The dead-time compensator 144 includes, as shown in FIG. 12, the following elements. A current polarity determination portion 1444 determines the polarity of the output current I based on the detected current value output from the current detector 3. A dead-time compensated voltage generator 1441 generates a dead-time compensated voltage ΔV1. A carrier wave corrected voltage generator 1442 generates a carrier wave corrected voltage ΔV2 in synchronization with the carrier wave frequency fc output from the carrier wave frequency changer 45. An adder 443 adds the carrier wave corrected voltage ΔV2 to the dead-time compensated voltage ΔV1 and outputs the resulting dead-time compensation corrected voltage ΔV to the adder 46.

The current polarity determination portion 1444 determines the polarity of the output current I by using the detected current value output from the current detector 3, and outputs the resulting current polarity signal to the dead-time compensated voltage generator 1441 and the carrier wave corrected voltage generator 1442.

If the polarity of the current polarity signal output from the current polarity determination portion 1444 is positive, the dead-time compensated voltage generator 1441 generates a constant positive value as the dead-time compensated voltage ΔV1. If the polarity of the current polarity signal output from the current polarity determination portion 1444 is negative, the dead-time compensated voltage generator 1441 generates a constant negative value as the dead-time compensated voltage ΔV1.

If the polarity of the current polarity signal output from the current polarity determination portion 1444 is positive, the carrier wave corrected voltage generator 1442 generates a carrier wave corrected voltage ΔV2 that changes over time at the same rate of change as that of the carrier wave frequency fc. If the polarity of the current polarity signal output from the current polarity determination portion 1444 is negative, the carrier wave corrected voltage generator 1442 generates a carrier wave corrected voltage ΔV2 that changes over time at a rate whose numerical value is the same as the rate at which the carrier wave frequency fc changes and whose sign is opposite to the rate of the carrier wave frequency fc.

Figure 13A:
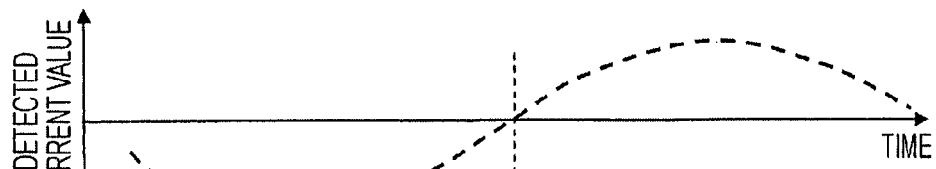
FIGS. 13A through 13E illustrate, respectively, a detected current value, a dead-time compensated voltage, a carrier wave frequency, a carrier wave corrected voltage and a dead-time compensation corrected voltage output of the dead-time compensator shown in FIG. 12.
Figure 13B:
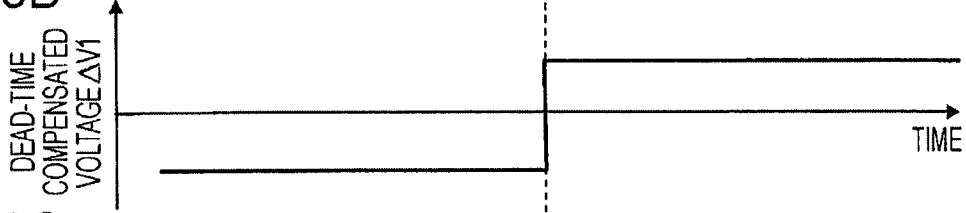
Figure 13C:
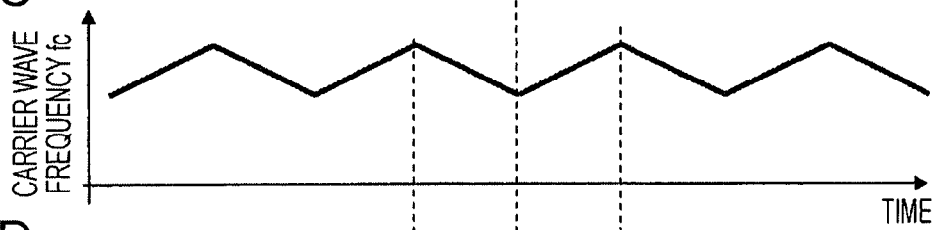
Figure 13D:
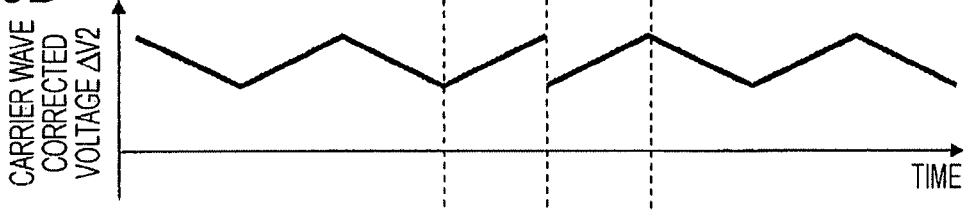
Figure 13E:
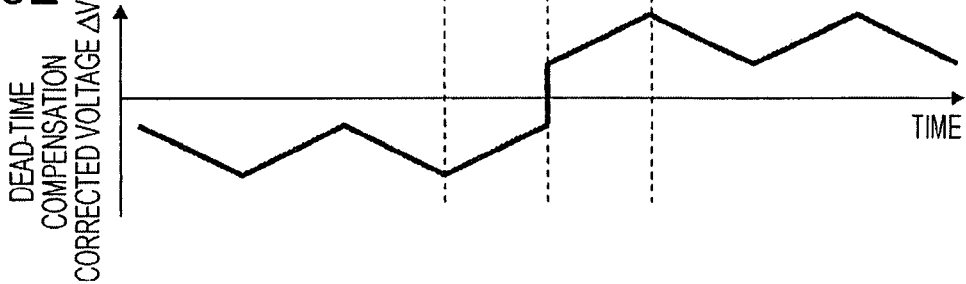

FIGS. 13A through 13E illustrate variables relevant to the dead-time compensation corrected voltage ΔV with reference to FIG. 12. More specifically, FIG. 13A illustrates a temporal change in the detected current value output from the current detector 3. FIG. 13B illustrates the dead-time compensated voltage AVE. FIG. 13C illustrates a temporal change in the carrier wave frequency fc. FIG. 13D illustrates the carrier wave corrected voltage ΔV2. FIG. 13E illustrates the dead-time compensation corrected voltage ΔV. FIGS. 13A through 13E illustrate the waveforms for one cycle of the detected current value.

As illustrated on the right half of FIGS. 13A through 13E, when the current polarity determination portion 1444 determines from the detected current value output from the current detector 3 that the polarity of the current polarity signal is positive (FIG. 13A), the dead-time compensated voltage generator 1441 generates the dead-time compensated voltage ΔV1 with a constant positive value (FIG. 13B), and the carrier wave corrected voltage generator 1442 generates the carrier wave corrected voltage ΔV2 (FIG. 13D) that changes over time at the same rate as the carrier wave frequency fc (FIG. 13C).

In contrast, as illustrated on the left half of FIGS. 13A through 13E, when the current polarity determination portion 1444 determines from the detected current value output from the current detector 3 that the polarity of the current polarity signal is negative (FIG. 13A), the dead-time compensated voltage generator 1441 generates the dead-time compensated voltage ΔV1 with a constant negative value (FIG. 13B), and the carrier wave corrected voltage generator 1442 generates the carrier wave corrected voltage ΔV2 (FIG. 13D) that changes over time at a rate whose numerical value is the same as that of the rate of change of the carrier wave frequency fc and whose sign is opposite to the carrier wave frequency fc (FIG. 13C).

The adder 443 adds the carrier wave corrected voltage ΔV2 to the dead-time compensated voltage ΔV1 and outputs the resulting dead-time compensation corrected voltage ΔV shown in FIG. 13E to the adder 46. As in the first embodiment, the adder 46 adds the dead-time compensation corrected voltage ΔV to the voltage command and outputs the resulting command value signal to the control signal generator 43. The control signal generator 43 then generates a control signal from the command value signal and the carrier wave signal output from the carrier wave signal generator 42, and outputs the control signal to the gate terminals of the transistors Tu+, Tu−, Tv+, Tv−, Tw+ and Tw− of the inverter 2.

As discussed above, in the control unit 14 of the power converter of the second embodiment, the dead-time compensator 144 includes a current polarity determination portion 1444 that determines the polarity of the output current I from the detected current value output from the current detector 3 and that outputs a current polarity signal indicating the polarity of the detected current value to the dead-time compensated voltage generator 1441 and the carrier wave corrected voltage generator 1442. If the polarity of the detected current value is positive, the dead-time compensated voltage generator 1441 generates the dead-time compensated voltage ΔV1 having a constant positive value, and the carrier wave corrected voltage generator 1442 generates the carrier wave corrected voltage ΔV2 that changes over time at the same rate as that of the carrier wave frequency fc. In contrast, if the polarity of the detected current value is negative, the dead-time compensated voltage generator 1441 generates the dead-time compensated voltage ΔV1 having a constant negative value, and the carrier wave corrected voltage generator 1442 generates the carriers wave corrected voltage ΔV2 that changes over time at a rate whose numerical value is the same as that of the rate of change of the carrier wave frequency fc and whose sign is opposite to the carrier wave frequency fc. Thus, as in the first embodiment, even if the carrier wave frequency fc changes over time, the occurrence of ripples and the output fluctuations and operation irregularities of a load caused by the occurrence of ripples can be suppressed while inhibiting the occurrence of error voltages.

A power converter configured in accordance with a third embodiment of the invention is described below with reference to FIGS. 14 through 16B. In the third embodiment, elements similar to those in the first embodiment are designated with like reference numerals. The power converter of the third embodiment is different from the first embodiment in the dead-time compensator of the control unit. Details of the configuration of the dead-time compensator in the third embodiment are discussed below.

Figure 14:
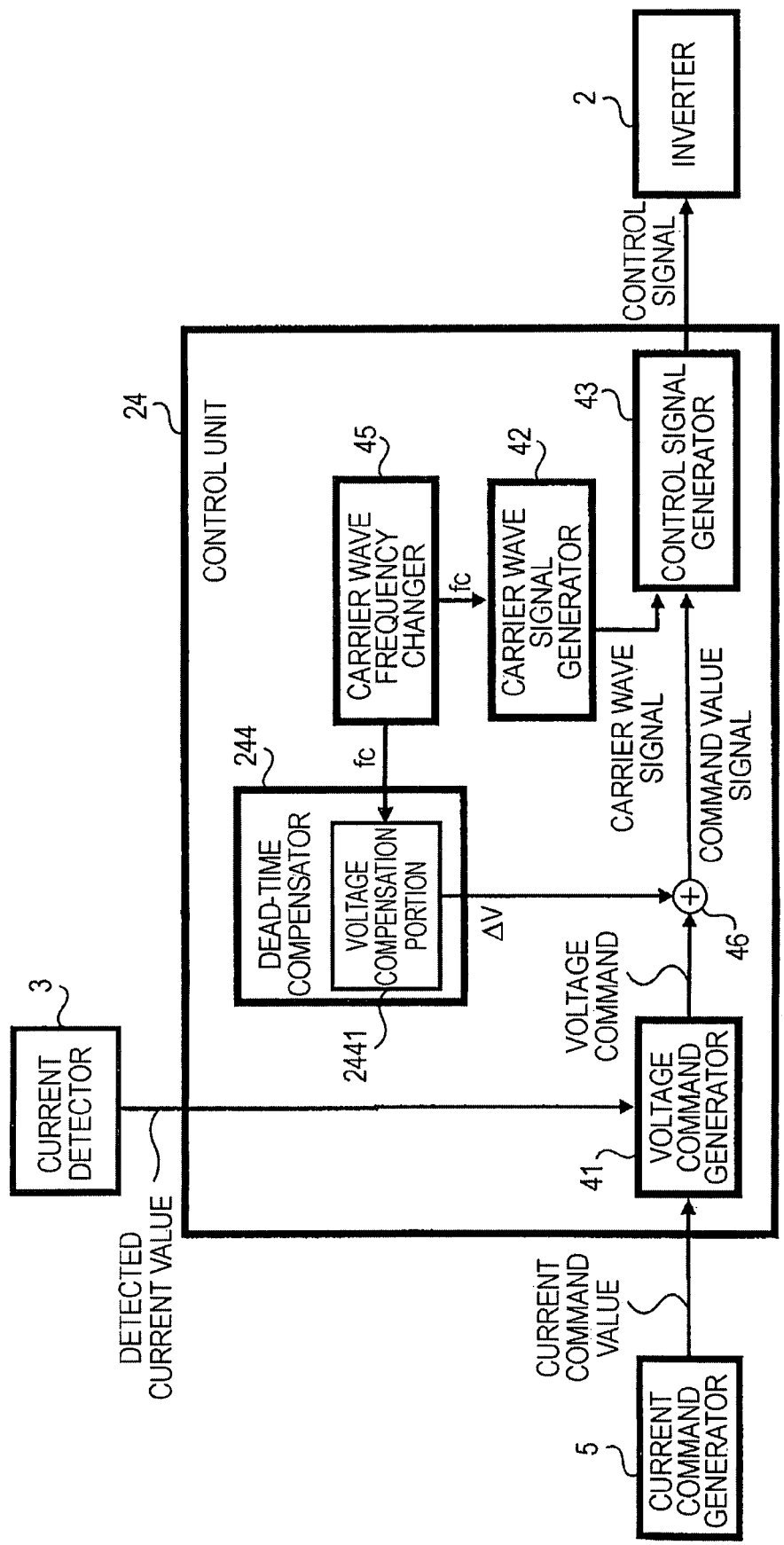
FIG. 14 is a block diagram illustrating a control unit of a power converter configured in accordance with a third embodiment of the invention.

FIG. 14 illustrates a control unit 24 of the power converter of the third embodiment. The control unit 24 includes the following elements. A voltage command generator 41 generates a voltage command based on a current command value output from the current command generator 5 and a detected current value output from the current detector 3. A carrier wave signal generator 42 generates a carrier wave signal. A dead-time compensator 244 outputs a dead-time compensation corrected voltage ΔV. An adder 46 adds the dead-time compensation corrected voltage ΔV to the voltage command to generate a command value signal. A control signal generator 43 compares (e.g., by PWM comparison) the command value signal with the carrier wave signal and generates a control signal for turning ON or OFF the transistors of the inverter 2. A carrier wave frequency changer 45 changes the carrier wave frequency fc. The dead-time compensator 244 includes a voltage compensation portion 2441 that generates the dead-time compensation corrected voltage ΔV in synchronization with the carrier wave frequency fc output from the carrier wave frequency changer 45.

Figures 15A, 15B:
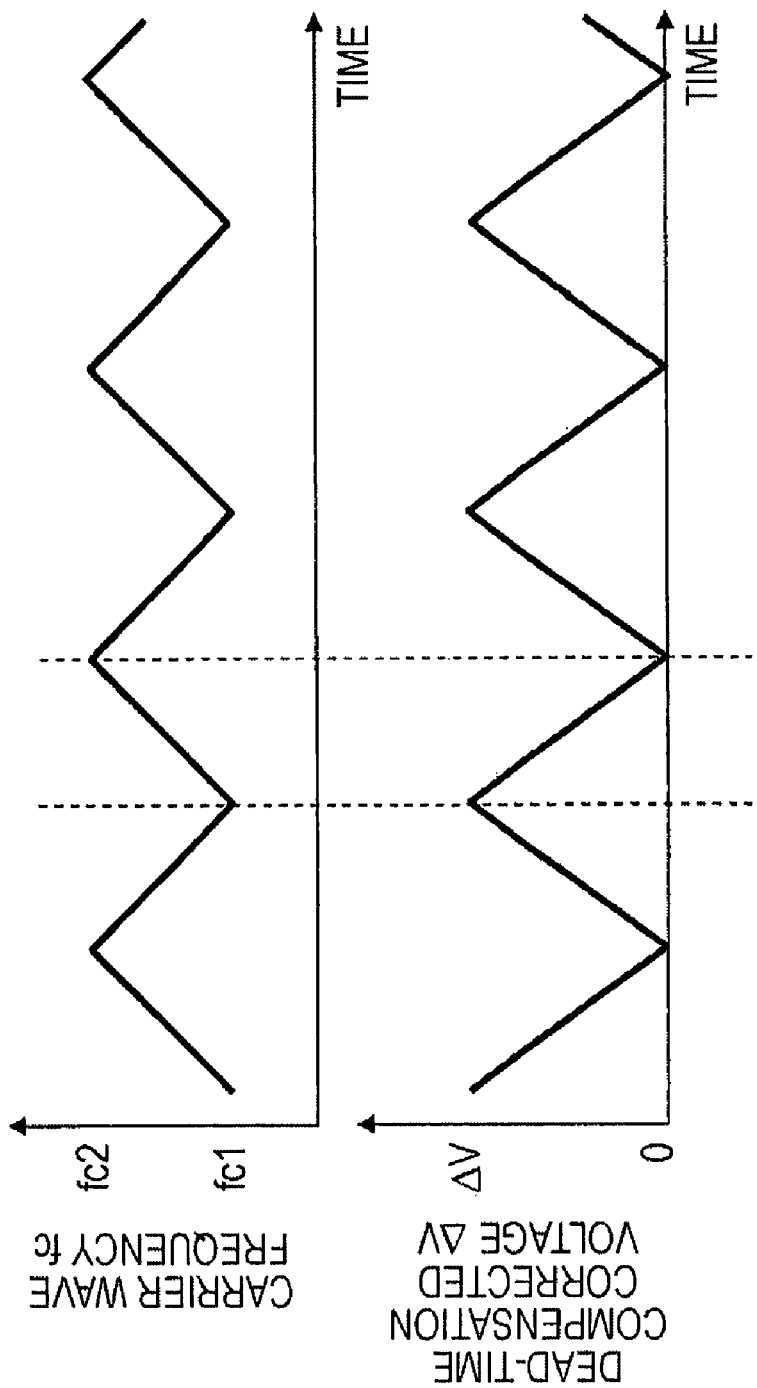
FIGS. 15A and 15B illustrate a carrier wave frequency and a dead-time compensation corrected voltage, respectively, of the control unit shown in FIG. 14.

FIG. 15A illustrates a temporal change in the carrier wave frequency fc output from the carrier wave frequency changer 45 in the third embodiment. FIG. 15B illustrates the dead-time compensation corrected voltage ΔV generated from the voltage compensation portion 2441 shown in FIG. 14. The dead-time compensation corrected voltage ΔV is synchronized with the carrier wave frequency fc output from the carrier wave frequency changer 45. The dead-time compensation corrected voltage ΔV(t) is expressed by the equation:

$$\Delta V(t)=|fc(t)-fc1|\times Td\times Vdc;\ \text{or} \quad (4)$$

$$\Delta V(t)=|fc(t)-fc2|\times Td\times Vdc;\ \text{wherein} \quad (5)$$

fc(t) represents a temporal change in the carrier wave frequency;

fc1 and fc2 designate the minimum value and the maximum value of the carrier wave frequency fc;

Td indicates the dead time; and

Vdc represents the power supply voltage. It should be noted that the dead time Td is constant.

In the third embodiment, as shown in FIG. 15B, the dead-time compensation corrected voltage ΔV(t) calculated from equation (5) is used. However, equation (4) may be used for calculating the dead-time compensation corrected voltage ΔV(t). The dead-time compensation corrected voltage ΔV(t) is synchronized, as shown in FIG. 15B, with the carrier wave frequency fc(t). Accordingly, even if the carrier wave frequency fc(t) changes over time, the voltage compensation portion 2441 can output the dead-time compensation corrected voltage ΔV(t) that is synchronized with a temporal change in the carrier wave frequency fc(t).

Figure 16A:
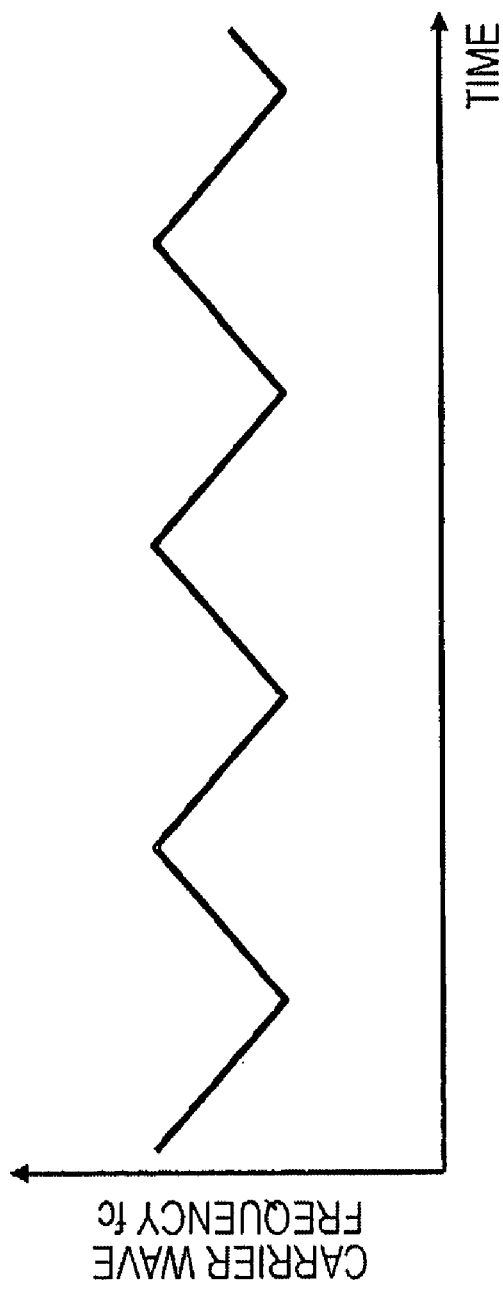
FIGS. 16A and 16B illustrate, respectively, a carrier wave frequency and output voltages output from the inverter shown in FIG. 14.
Figure 16B:
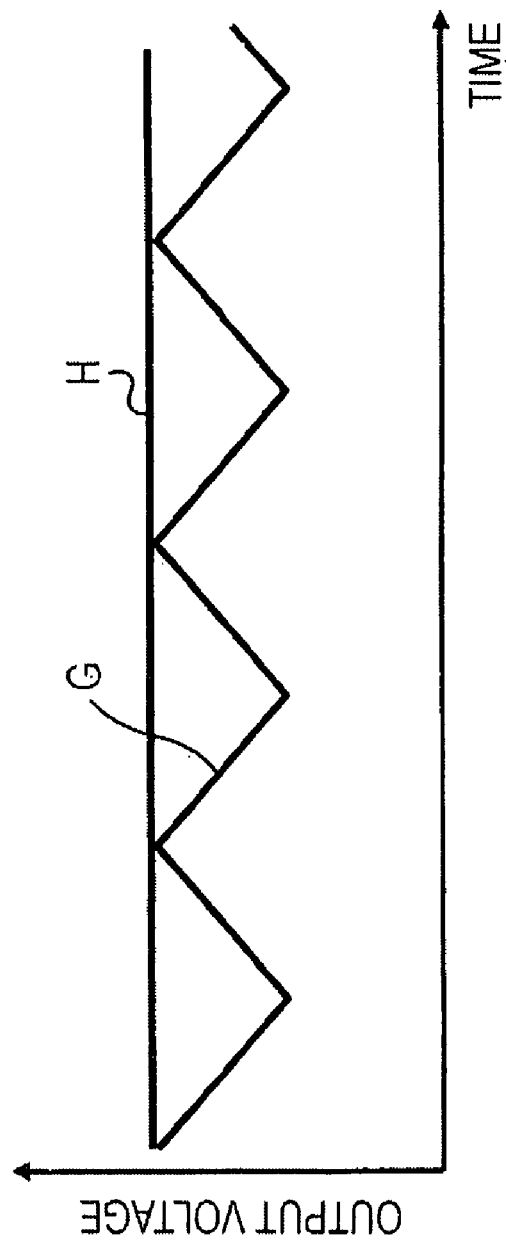

FIG. 16A illustrates a temporal change in the carrier wave frequency fc that is output from the carrier wave frequency changer 45 in the third embodiment. FIG. 16B illustrates the voltage waveforms output from the inverter 2 in the third embodiment. In FIG. 16B, the waveform G represents the voltage waveform when the carrier-wave frequency fc is changed over time, as shown in FIG. 16A, but the dead-time compensation voltage is constant. In contrast, the waveform H represents the voltage waveform when the dead-time compensation corrected voltage ΔV output from the voltage compensation portion 2441 is changed in accordance with a temporal change in the carrier wave frequency fc as shown in FIG. 15B. FIG. 16B shows that, upon comparing the waveform G with the waveform H, voltage ripples synchronizing with a temporal change in the carrier wave frequency fc can be observed in the waveform G.

However, changing the dead-time compensation corrected voltage ΔV in accordance with a temporal change in the carrier wave frequency fc can suppress ripples in the output voltage caused by a temporal change in the carrier wave frequency fc, as is evident from waveform H. That is, even if the carrier wave frequency changes, the output voltage can be maintained at substantially a constant value.

As described above, the dead-time compensator 244 in the third embodiment changes the dead-time compensation corrected voltage ΔV based on the maximum value fc2 or the minimum value fc1 of the carrier wave frequency fc so that the error voltage can be maintained at substantially a constant value. That is, the dead-time compensator 244 (and more specifically, the voltage compensation portion 2441) outputs the dead-time compensation corrected voltage ΔV(t) that synchronizes with a temporal change in the carrier wave frequency fc(t). Accordingly, an output error of the inverter 2 caused by fluctuations in the carrier wave frequency fc, i.e., the occurrence of voltage (and hence, current) ripples, can be suppressed. Additionally, as in the first embodiment, changing the carrier wave frequency fc can reduce switching noise having spectral components exhibiting a high noise level for the carrier wave frequency fc and n-order higher harmonic frequencies of the carrier wave frequency fc.

A power converter in accordance with a fourth embodiment of the invention is described below with reference to FIGS. 17 and 18A-18C. In the fourth embodiment, elements similar to those in the third embodiment are designated with like reference numerals. The power converter of the fourth embodiment is different from that of the third embodiment in the dead-time compensator of the control unit. Details of the configuration of the dead-time compensator in the fourth embodiment are given below.

Figure 17:
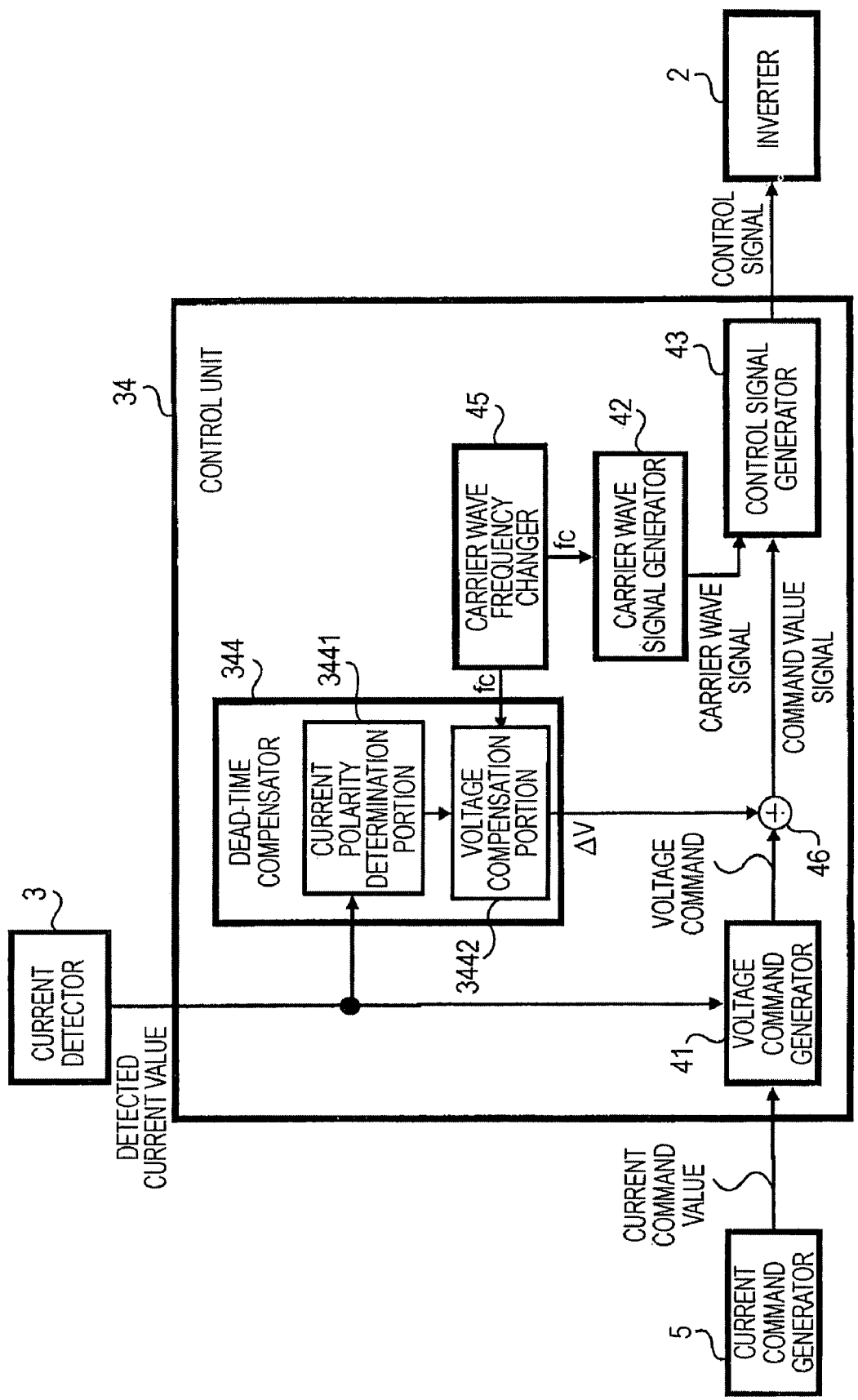
FIG. 17 is a block diagram illustrating a control unit of a power converter configured in accordance with a fourth embodiment of the invention.

FIG. 17 illustrates a control unit 34 of the power converter of the fourth embodiment. In the Control unit 34, a voltage command generator 41 generates a voltage command based on a current command value output from the current command generator 5 and a detected current value output from the current detector 3. A carrier wave signal generator 42 generates a carrier wave signal. A dead-time compensator 344 outputs a dead-time compensation corrected voltage ΔV. An adder 46 adds the dead-time compensation corrected voltage ΔV to the voltage command to generate a command value signal. A control signal generator 43 generates a control signal from the command value signal and the carrier wave signal. A carrier wave frequency changer 45 changes the carrier wave frequency fc.

The dead-time compensator 344 includes, as shown in FIG. 17, a current polarity determination portion 3441 that determines the polarity of the detected current value output from the current detector 3 based on the detected current value and a voltage compensation portion 3442 that generates the dead-time compensation corrected voltage ΔV in synchronization with the carrier wave frequency fc output from the carrier wave frequency changer 45.

The current polarity determination portion 3441 determines the polarity of the detected current value output from the current detector 3 and outputs the resulting current polarity signal to the voltage compensation portion 3442. If the polarity of the current polarity signal output from the current polarity determination portion 3441 is positive, the voltage compensation portion 3442 generates the dead-time compensation corrected voltage ΔV that changes over time at the same rate as the carrier wave frequency fc. If the polarity of the current polarity signal output from the current polarity determination portion 3441 is negative, the voltage compensation portion 3442 generates the dead-time compensation corrected voltage ΔV that changes over time at a rate whose numerical value is the same as the rate of change of the carrier wave frequency fc and whose sign is opposite to the rate of change of the carrier wave frequency fc.

Figures 18A, 18B, 18C:
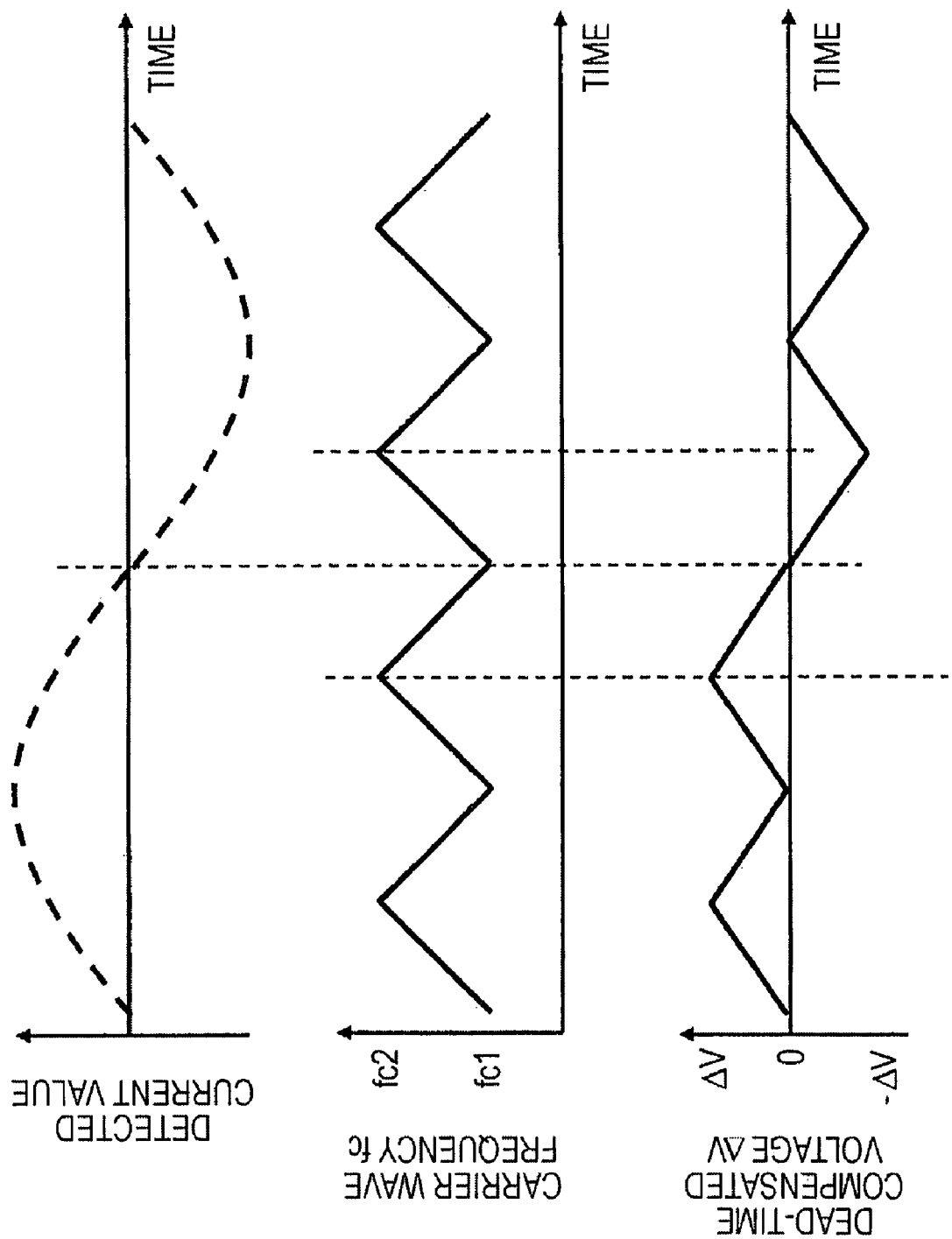
FIGS. 18A, 18B and 18C illustrate a detected current value, a carrier wave frequency and a dead-time compensation corrected voltage, respectively, of the control unit shown in FIG. 17.

FIG. 18A illustrates a temporal change in the detected current value output from the current detector 3. FIG. 18B illustrates a temporal change in the carrier wave frequency fc. FIG. 18C illustrates the dead-time compensation corrected voltage ΔV. FIGS. 18A through 18C illustrate the waveforms for one cycle of the detected current value.

As illustrated by the left half of FIGS. 18A-18C, when the current polarity determination portion 3441 determines that the polarity of the detected current value is positive (FIG. 18A), the voltage compensation portion 3442 generates the dead-time compensation corrected voltage ΔV (FIG. 18C) that changes over time at the same rate as the carrier wave frequency fc changes (FIG. 18B). On the other hand, as illustrated by the right half of FIGS. 18A-18C, when the current polarity determination portion 3441 determines that the polarity of the detected current value is negative (FIG. 18A), the voltage compensation portion 3442 generates the dead-time compensation corrected voltage ΔV (FIG. 18C) that changes over time at a rate whose numerical value is the same as the rate of change of the carrier wave frequency fc and whose sign is opposite to the rate of change of the carrier wave frequency fc (FIG. 18B).

The dead-time compensation corrected voltage ΔV(t) is expressed by the equation:

$$|\Delta V(t)| = |fc(t) - fc1| \times Td \times Vdc; \text{ or} \quad (6)$$

$$|\Delta V(t)| = |fc(t) - fc2| \times Td \times Vdc; \text{ wherein} \quad (7)$$

fc(t) represents a temporal change in the carrier wave frequency;

fc1 and fc2 designate the minimum value and the maximum value, respectively, of the carrier wave frequency fc;

Td indicates the dead time; and

Vdc represents the power supply voltage. It should be noted that the dead time Td is constant.

In the fourth embodiment, as shown in FIG. 18C, the dead-time compensation corrected voltage ΔV(t) calculated from equation (6) is used. However, equation (7) may be used for calculating the dead-time compensation corrected voltage ΔV(t). The dead-time compensation corrected voltage ΔV(t) is synchronized with the carrier wave frequency fc(t). Accordingly, even if the carrier wave frequency fc(t) changes over time, the voltage compensation portion 3442 can output the dead-time compensation corrected voltage ΔV(t) that is synchronized with a temporal change in the carrier wave frequency fc(t). That is, even if an error voltage is contained in the output voltage, the error voltage can be maintained at substantially a constant value.

As described above, the dead-time compensator 344 in the fourth embodiment changes the dead-time compensation corrected voltage ΔV based on the maximum value fc2 or the minimum value fc1 of the carrier wave frequency fc so that the error voltage can be maintained at substantially a constant value. That is, the dead-time compensator 344 outputs the dead-time compensation corrected voltage ΔV(t) that synchronizes with a temporal change in the carrier wave frequency fc(t). Accordingly, as in the third embodiment, output errors of the inverter 2 caused by fluctuations in the carrier wave frequency fc, i.e., the occurrence of voltage (and, hence, current) ripples, can be suppressed. Additionally, the dead-time compensator 344 changes the polarity of the dead-time compensation corrected voltage ΔV(t) based on the polarity of the output current I obtained from the current polarity determination portion 3441. Thus, even if the polarity of the detected current value output from the current detector 3 is changed, the occurrence of output errors, i.e., the occurrence of output ripples, of the inverter 2 caused by fluctuations of the carrier wave frequency fc can be reduced.

Additionally, as in the third embodiment, changing the carrier wave frequency fc can reduce switching noise having spectral components exhibiting a high noise level for the carrier wave frequency fc and n-order higher harmonic frequencies of the carrier wave frequency fc.

A power converter configured in accordance with a fifth embodiment of the invention is described below with reference to FIGS. 19 through 23B. In the fifth embodiment, elements similar to those of the fourth embodiment are designated with like reference numerals. The power converter of the fifth embodiment is different from that of the fourth embodiment in the following points. First, a synchronous motor 16 is used instead of a general motor 6. The synchronous motor 16 includes a position detector 8, and the current detector 3 is not disposed between an inverter 12 and the synchronous motor 16.

Figure 20:
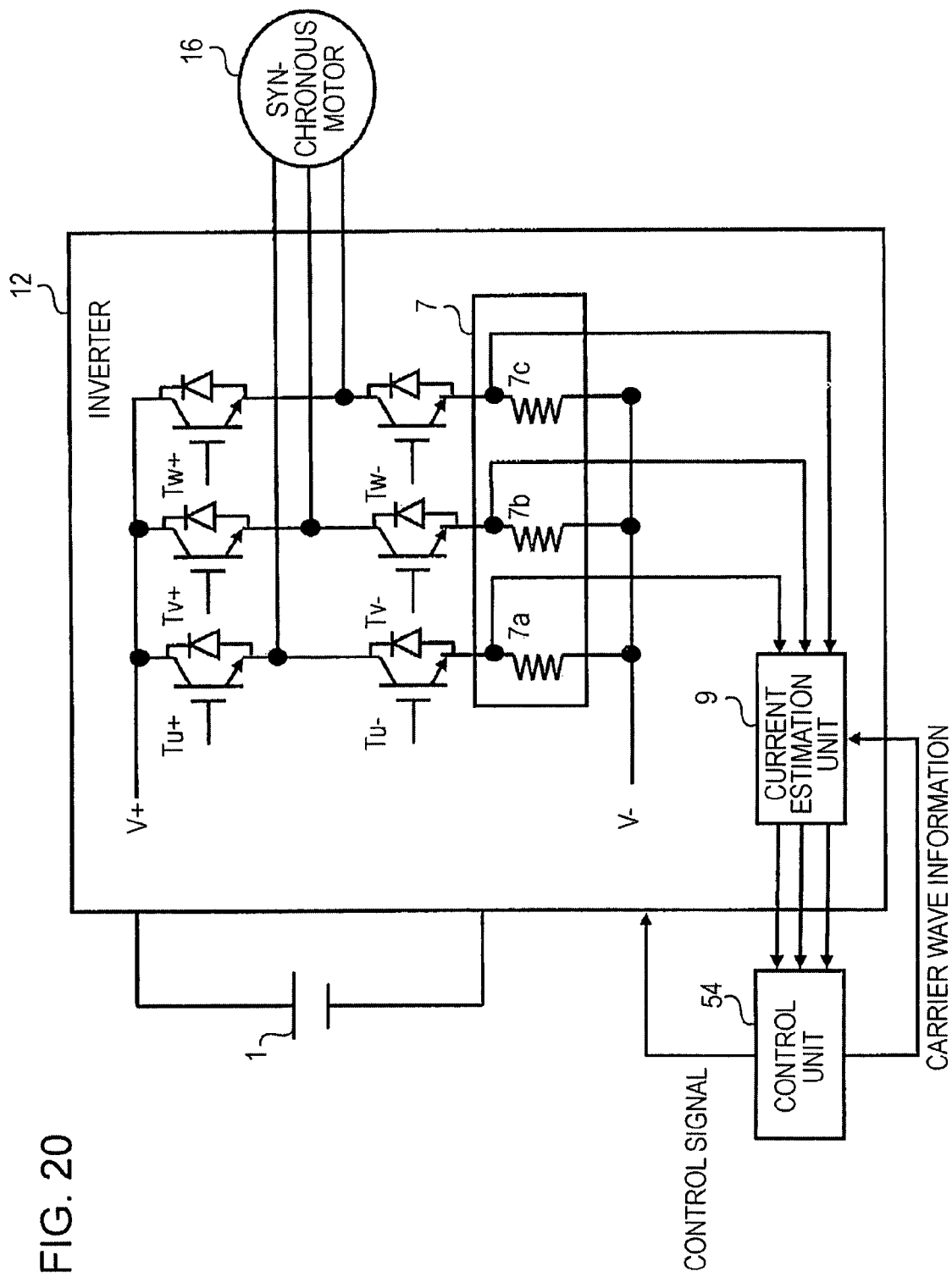
FIG. 20 illustrates an inverter shown in FIG. 19.
Figure 21:
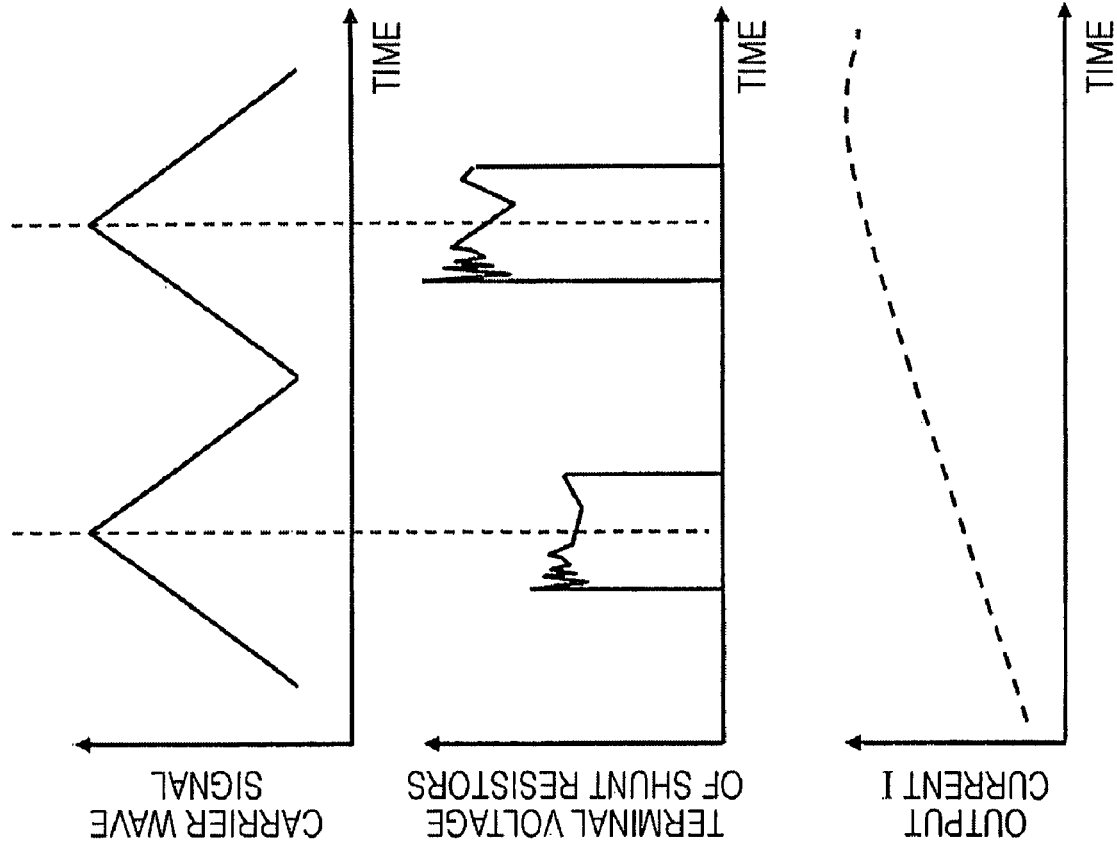
FIGS. 21A, 21B and 21C illustrate the relationship between the terminal voltage of a shunt resistor unit shown in FIG. 20 and a carrier wave signal.

FIG. 20 illustrates the inverter 12 in the fifth embodiment. The inverter 12 includes a shunt resistor unit 7 and a current estimation unit 9.

The shunt resistor unit 7 includes shunt resistors 7a, 7b and 7c connected in series to the negative terminals of the transistors Tu−, Tv− and Tw−, respectively.

The current estimation unit 9 estimates the output current I of the inverter 12 based on the terminal voltage of the shunt resistors 7a, 7b and 7c. Additionally, since a control signal supplied to the inverter 12 is changed in accordance with a change in the carrier wave frequency fc, a control unit 54 supplies carrier wave information concerning the carrier wave frequency fc output from a carrier wave frequency changer 45 to the current estimation unit 9.

FIGS. 21A through 21C illustrate the relationship between the terminal voltage of the shunt resistor unit 7 shown in FIG. 20 and the carrier wave signal. FIG. 21A illustrates a carrier wave signal for generating a control signal used for turning ON or OFF the transistors Tu+, Tu−, Tv+, Tv−, Tw+ and Tw− of the inverter 12. FIG. 21B illustrates one terminal voltage among the terminal voltages (i.e., one of three phases) of the shunt resistors 7a, 7b and 7c. FIG. 21C illustrates the output current I of the inverter 12.

The current estimation unit 9 estimates the output current I shown in FIG. 21C from the terminal voltage of the shunt resistors 7a, 7b and 7c. The current estimation unit 9 detects the terminal voltage of the shunt resistors 7a, 7b and 7c at the peak of the carrier wave signal, as indicated by the broken lines in FIGS. 21A and 21B. Even if the carrier wave frequency fc changes, the current estimation unit 9 can always detect the terminal voltage of the shunt resistors 7a, 7b and 7c at the peak of the carrier wave signal by using the carrier wave information concerning the carrier wave frequency fc output from the carrier wave frequency changer 45, which is discussed below.

Figure 22:
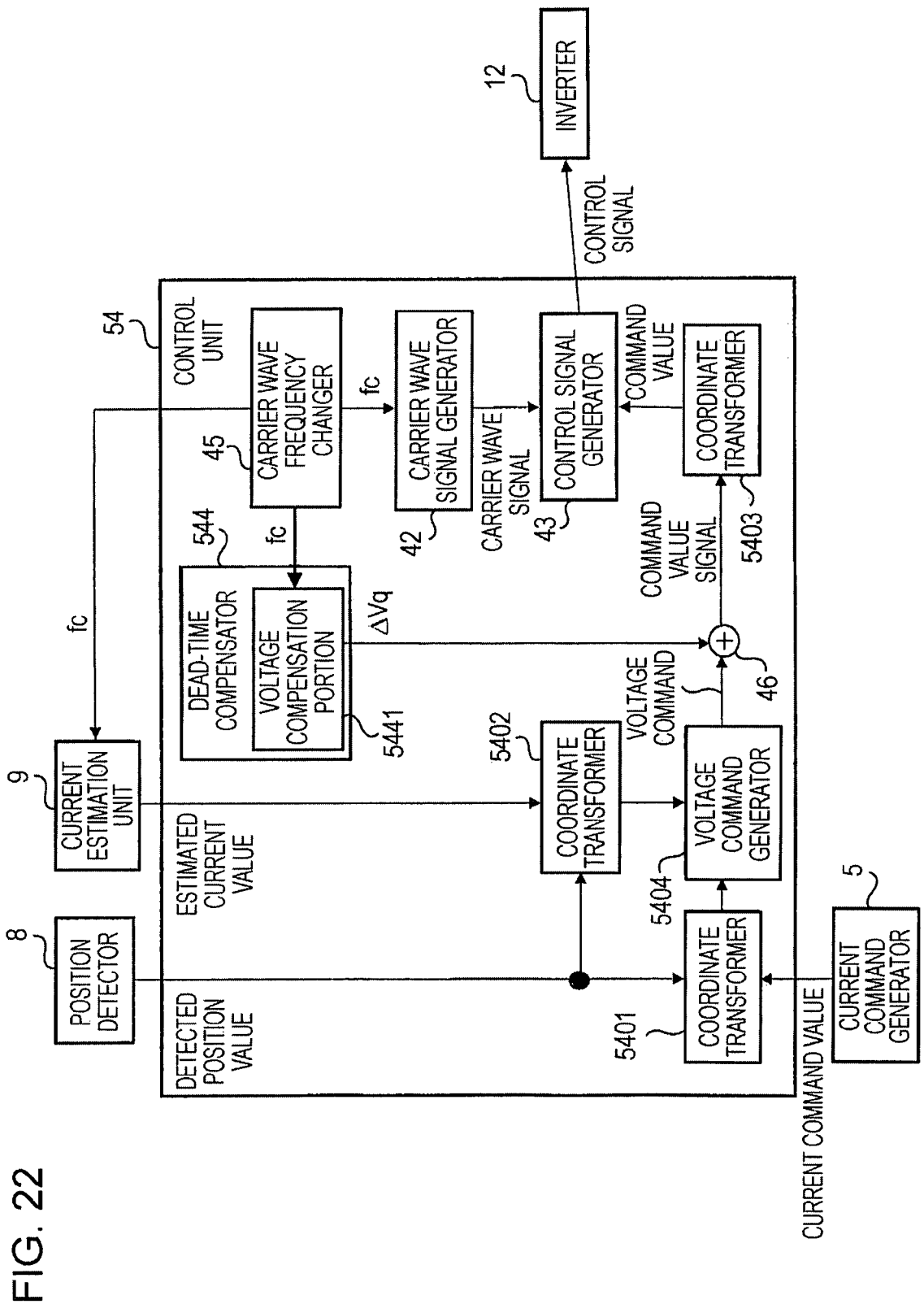
FIG. 22 illustrates a control unit shown in FIG. 19.

FIG. 22 illustrates the control unit 54 in the fifth embodiment. In the control unit 54, a coordinate transformer 5401 transforms a three-phase current command value output from the current command generator 5 into a two-phase current command value by using a detected position value output from the position detector 8.

A coordinate transformer 5402 transforms a three-phase current estimation value output from the current estimation unit 9 into a two-phase current estimation value by using a detected position value output from the position detector 8.

A voltage command generator 5404 generates a voltage command by using q-axis components transformed by the coordinate transformers 5401 and 5402. A carrier wave signal generator 42 generates a carrier wave signal. A dead-time compensator 544 outputs the dead-time compensation corrected voltage ΔVq, which is described below.

Figure 19:
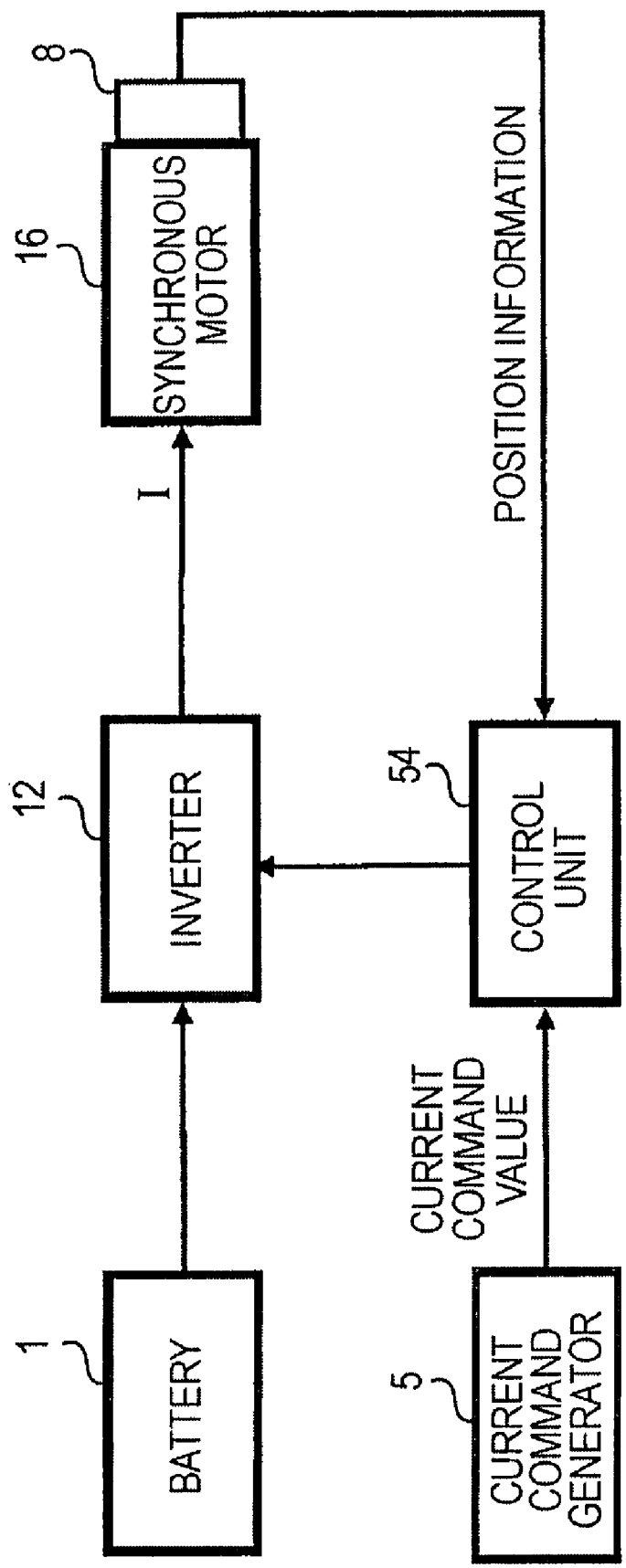
FIG. 19 is a block diagram illustrating a power converter configured in accordance with a fifth embodiment of the invention.

From among the direct-quadrature (d-q-axes) components of the synchronous motor 16 shown in FIG. 19, the dead-time compensator 544 outputs the dead-time compensation corrected voltage ΔVq of the q-axis voltage that compensates the voltage command of the q-axis component.

An adder 46 adds the dead-time compensation corrected voltage ΔVq to the voltage command to output the resulting command value signal. A coordinate transformer 5403 transforms the two-phase command value signal output from the adder 46 into a three-phase command value signal.

A control signal generator 43 generates a control signal based on the command value signal output from the coordinate transformer 5403 and the carrier wave signal output from the carrier wave signal generator 42. The carrier wave frequency changer 45 changes the carrier wave frequency fc. The position detector 8 detects the position of the magnetic pole of the synchronous motor 16, which is a permanent magnet synchronous motor, by using an encoder and outputs the detected position value. The dead-time compensator 544 includes a voltage compensation portion 5441 that generates the dead-time compensation corrected voltage ΔVq in synchronization with the carrier wave frequency fc output from the carrier wave frequency changer 45. The carrier wave frequency changer 45 outputs the carrier wave frequency fc to the current estimation unit 9 as carrier wave information.

Figures 23A, 23B:
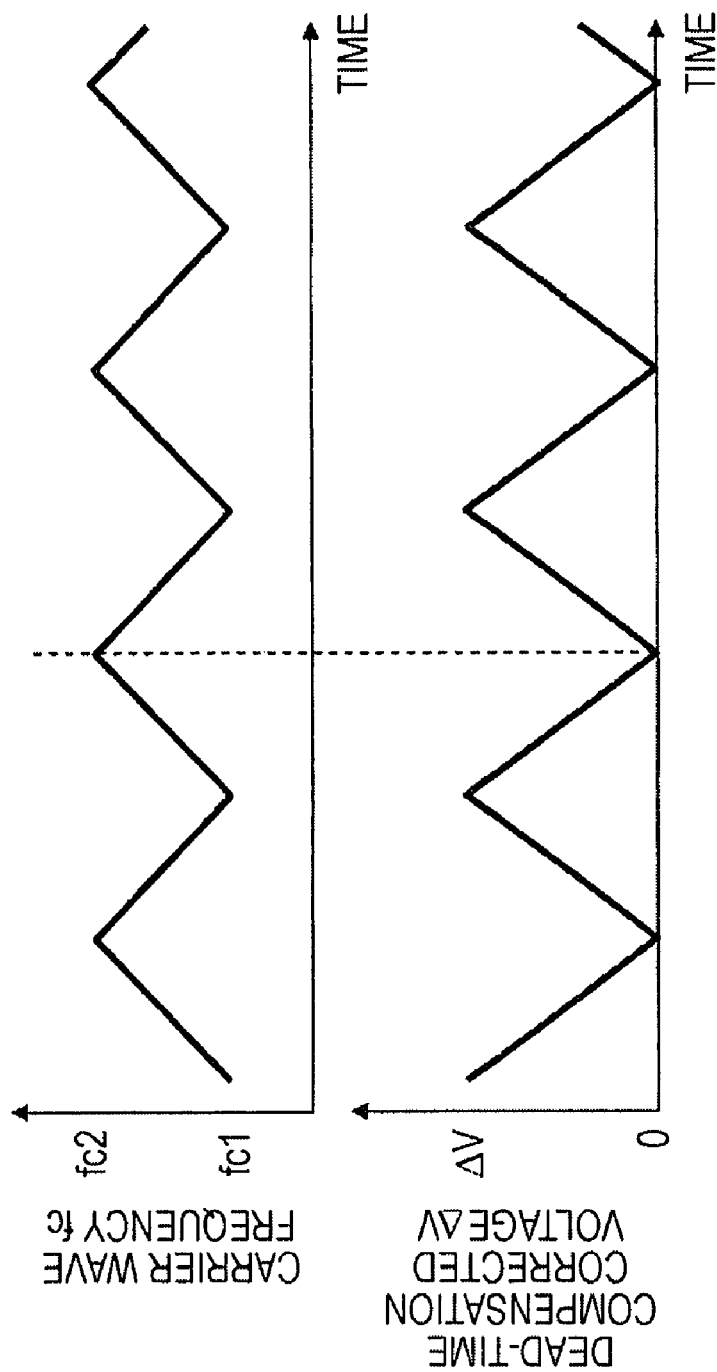
FIGS. 23A and 23B respectively illustrate a carrier wave frequency and a dead-time compensation corrected voltage of the control unit shown in FIG. 22.

Finally, FIG. 23A illustrates a temporal change in the carrier wave frequency fc output from the carrier wave frequency changer 45 shown in FIG. 22. FIG. 23B illustrates the dead-time compensation corrected voltage ΔVq(t) generated from the voltage compensation portion 5441 shown in FIG. 22. The dead-time compensation corrected voltage ΔVq(t) is synchronized with the carrier wave frequency fc output from the carrier wave frequency changer 45.

The dead-time compensation corrected voltage ΔVq(t) is expressed by the equation:

$$\Delta Vq(t)=\sqrt{(3/2)} \times |fc(t)-fc1| \times Td \times Vdc; \text{ or} \tag{8}$$

$$\Delta Vq(t)=\sqrt{(3/2)} \times |fc(t)-fc2| \times Td \times Vdc; \text{ wherein} \tag{9}$$

fc(t) represents a temporal change in the carrier wave frequency fc;

fc1 and fc2 designate the minimum value and the maximum value, respectively, of the carrier wave frequency fc;

Td indicates the dead time; and

Vdc represents the power supply voltage. It should be noted that the dead time Td is constant. Also, the synchronous motor 16 corrects only the q-axis voltage.

In the fifth embodiment, as shown in FIG. 23B, the dead-time compensation corrected voltage ΔVq(t) calculated from equation (9) is used. However, equation (8) may be used for calculating the dead-time compensation corrected voltage ΔVq(t).

As also shown in FIG. 23B, the dead-time compensation corrected voltage ΔVq(t) is synchronized with the carrier wave frequency fc(t). Accordingly, even if the carrier wave frequency fc(t) changes over time, the voltage compensation portion 5441 can output the dead-time compensation corrected voltage ΔVq(t) synchronized with a temporal change in the carrier wave frequency fc(t). That is, even if an error voltage is contained in the output voltage, the error voltage can be maintained at substantially a constant value.

As described above, the dead-time compensator 544 in the fifth embodiment changes the dead-time compensation corrected voltage ΔVq based on the maximum value fc2 or the minimum value fc1 of the carrier wave frequency fc so that the error voltage can be maintained at substantially a constant value. That is, the dead-time compensator 544 outputs the dead-time compensation corrected voltage ΔVq(t) synchronized with a temporal change in the carrier wave frequency fc(t). Accordingly, as in the fourth embodiment, output errors of the inverter 12 caused by fluctuations in the carrier wave frequency fc, i.e., the occurrence of voltage (and, hence, current) ripples, can be suppressed. Additionally, in the fifth embodiment, the synchronous motor 16 is used. Accordingly, by merely compensating the q-axis voltage, the occurrence of voltage (current) ripples can be suppressed without the need to add the current polarity determination portion 3441 even if the carrier wave frequency fc changes. Additionally, as in the fourth embodiment, changing the carrier wave frequency fc can reduce switching noise having spectral components exhibiting a high noise level for the carrier wave frequency fc and n-order higher harmonic frequencies of the carrier wave frequency fc.

While the invention has been described with reference to exemplary embodiments, it is to be understood that the invention is not limited to these embodiments. The invention is applicable to various other embodiments.

For example, in the first through fifth embodiments, the battery 1 is used as the DC power supply. However, instead of the use of a battery, a converter circuit that rectifies an AC voltage supplied from a commercial power supply to a DC voltage may be used.

Although in the first through fifth embodiments the motor 6 is used as a load, other types of loads may be used.

In the first through fifth embodiments, a voltage command generated from the voltage command generator 41 or 5404 of the control unit 4, 14, 24, 34 or 54 is output to the adder 46. Alternatively, a voltage command may be input from an external source.

In the first through fourth embodiments, the control signal generator 43 compares the level of the command value signal output from the adder 46 with that of the carrier wave signal by the use of a comparator. Alternatively, comparison may be made by computation. Similarly, in the fifth embodiment, the control signal generator 43 compares the level of the command value signal output from the coordinate transformer 5403 with that of the carrier wave signal by the use of a comparator. However, comparison may be made by computation.

in the first through fifth embodiments, the carrier wave signal generator 42 performs frequency modulation on the carrier wave frequency fc output from the carrier wave frequency changer 45 to generate a carrier wave signal. However, a carrier wave signal may be generated from a voltage waveform output from the carrier wave frequency changer 45 by the use of a voltage-controlled oscillator (VOC).

In the first through fourth embodiments, the current sensors 3a, 3b and 3c are disposed as the current detector 3 between the inverter 2 and the motor 6. Alternatively, shunt resistors may be disposed between the inverter 2 and the motor 6 to detect a current. Although the current sensors 3a, 3b and 3c are provided for the corresponding phases of the output current, only two current sensors may be provided for two phases, and the remaining phase may be determined by computation.

In the fifth embodiment, the shunt resistors 7a, 7b and 7c are connected as the shunt resistor unit 7 in series to the transistors Tu−, Tv− and Tw−, respectively, of the inverter 12, and the current estimation unit 9 detects the voltage terminal of the shunt resistors 7a, 7b and 7c to estimate the output current I of the inverter 12. The invention is not restricted to this configuration, and the current detector 3 may be disposed between the inverter 2 and the synchronous motor 16, as in the first through fourth embodiments.

Although in the fifth embodiment the position detector 8 detects the position of the magnetic pole of the synchronous motor 16 by the use of an encoder, a resolver may be used instead.

Although in the first through fifth embodiments the carrier wave frequency fc is changed over time in a triangular form, it may be randomly changed over time.

In the first through fifth embodiments, the dead-time compensation corrected voltage $\Delta V$ or $\Delta Vq$ is calculated, by mathematical equations. Alternatively, a predetermined map may be read into a microcomputer, and the microcomputer may control the dead-time compensation corrected voltage $\Delta V$ or $\Delta Vq$ based on the map.

A reactor L, and a capacitor C may be provided for the inverter 2 or 12 in the first through fifth embodiments.

Accordingly, the above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A power converter control unit for a power converter including an inverter configured to convert a direct current voltage into an alternating current voltage by controlling switching devices to be turned ON or OFF based on a control signal and to output the alternating current voltage to a load, the control unit comprising:
   a command value output unit configured to output a command value;
   a carrier wave output unit configured to output a carrier wave having a frequency;
   a frequency changing unit configured to output the frequency to the carrier wave output unit, the frequency changing over time;
   a compensator connected to the frequency changing unit and configured to receive the frequency of the carrier wave from the frequency changing unit, to compensate the command value responsive to the frequency of the carrier wave to obtain a command value signal and to output the command value signal; and
   a control signal generator configured to compare the command value signal with the carrier wave and to generate the control signal based on a comparison result.

2. The power converter control unit according to claim 1 wherein the compensator is further configured to compensate the command value in synchronization with a change in the frequency of the carrier wave.

3. The power converter control unit according to claim 2 wherein the command value signal indicates a voltage; and wherein the compensator comprises:
   a compensated voltage generator configured to generate a compensated voltage having a constant value to compensate the command value;
   a carrier wave corrected voltage generator configured to generate a carrier wave corrected voltage in response to the frequency of the carrier wave; and
   an adder configured to add the compensated voltage to the carrier wave corrected voltage to generate a compensation corrected voltage as the command value signal.

4. The power converter control unit according to claim 3 wherein the carrier wave corrected voltage generator is further configured to synchronize the carrier wave corrected voltage with a change in the frequency of the carrier wave.

5. The power converter control unit according to claim 1 wherein the command value signal output from the compensator indicates a voltage; and wherein the compensator comprises:
   a compensated voltage generator configured to generate a compensated voltage having a constant value to compensate the command value;
   a carrier wave corrected voltage generator configured to generate a carrier wave corrected voltage in response to the frequency of the carrier wave; and
   an adder configured to add the compensated voltage to the carrier wave corrected voltage to generate a compensation corrected voltage as the command value signal.

6. The power converter control unit according to claim 5 wherein the carrier wave corrected voltage generator is further configured to synchronize the carrier wave corrected voltage with a change in the frequency of the carrier wave.

7. The power converter control unit according to claim 5 wherein the switching devices are connected in series; and wherein the compensation corrected voltage $\Delta V(t)$ is expressed by:

$$\Delta V(t) = fc(t) \times Td \times Vdc;\text{ wherein}$$

fc(t) is the frequency of the carrier wave at time t;
Td is a short-circuit prevention time set for controlling the switching devices to be simultaneously turned OFF; and
Vdc is the direct current voltage.

8. The power converter control unit according to claim 5 wherein the carrier wave corrected voltage $\Delta V2(t)$ is expressed by:

$$\Delta V2(t) = \{fc(t) - fa\} \times Td \times Vdc; \text{ wherein}$$

fa is an average of the frequencies of the carrier wave;
fc(t) is the frequency of the carrier wave at time t;
Td is a short-circuit prevention time set for controlling the switching devices to be simultaneously turned OFF; and
Vdc is the direct current voltage.

9. The power converter control unit according to claim 5 wherein the compensated voltage $\Delta V1$ is expressed by:

$$\Delta V1 = fa \times Td \times Vdc; \text{ wherein}$$

fa is an average of the frequencies of the carrier wave;
Td is a short-circuit prevention time set for controlling the switching devices to be simultaneously turned OFF; and
Vdc is the direct current voltage.

10. The power converter control unit according to claim 5 wherein the compensation corrected voltage $\Delta V(t)$ is expressed by:

$$\Delta V(t) = |fc(t) - fc1| \times Td \times Vdc, \text{ or}$$

$$\Delta V(t) = |fc(t) - fc2| \times Td \times Vdc; \text{ wherein}$$

fc(t) is the frequency of the carrier wave at time t;
fc1 is a minimum value of frequencies of the carrier wave;
fc2 is a maximum value of the frequencies of the carrier wave;
Td is a short-circuit prevention time set for controlling the switching devices to be simultaneously turned OFF; and
Vdc is the direct current voltage.

11. The power converter control unit according to claim 5 wherein the load is a synchronous motor and the compensator is further configured to compensate a q-axis voltage of the synchronous motor, the power converter further comprising:
a position detector configured to detect a position of a magnetic pole of the synchronous motor; and
a coordinate transformer configured to transform coordinates between a two-phase value and a three-phase value of the synchronous motor based on the position of the magnetic pole.

12. The power converter control unit according to claim 11 wherein the compensation corrected voltage for compensating the q-axis voltage $\Delta Vq(t)$ is expressed by:

$$\Delta Vq(t) = \sqrt{(3/2)} \times |fc(t) - fc1| \times Td \times Vdc, \text{ or}$$

$$\Delta Vq(t) = \sqrt{(3/2)} \times |fc(t) - fc2| \times Td \times Vdc; \text{ wherein}$$

fc(t) is the frequency of the carrier wave at time t;
fc1 is a minimum value of frequencies of the carrier wave;
fc2 is a maximum value of the frequencies of the carrier wave;
Td is a short-circuit prevention time set for controlling the switching devices to be simultaneously turned OFF; and
Vdc is the direct current voltage.

13. The power converter control unit according to claim 1 wherein the frequency changing unit is further configured to change the frequency of the carrier wave such that the frequency of the carrier wave forms a periodic waveform.

14. The power converter control unit according to claim 1, further comprising:

a current detector configured to detect a current from the inverter; and
a current polarity determination unit configured to determine a polarity of the current;
wherein the compensator is further configured to compensate the command value in accordance with the polarity of the current.

15. The power converter control unit according to claim 14 wherein the compensator is further configured compensate the command value using a carrier wave corrected voltage wherein the carrier wave corrected voltage, when the polarity is positive, changes at a same rate as a rate of change of the frequency of the carrier wave; and the carrier wave corrected voltage, when the polarity is negative, changes at a rate whose numerical value is the same as a rate of change of the frequency of the carrier wave and whose sign is opposite to a sign of the carrier wave.

16. A power converter control unit for a power converter, the power converter including an inverter configured to convert a direct current voltage into an alternating current voltage by controlling switching devices to be turned ON or OFF based on a control signal to supply the alternating current voltage to a load, the control unit comprising:
means for outputting a command value;
means for outputting a carrier wave having a frequency;
means for outputting the frequency to the carrier wave outputting means, the frequency changing over time;
means, connected to the frequency outputting means, for receiving the frequency of the carrier wave from the frequency outputting means, for compensating the command value responsive to the frequency of the carrier wave to obtain a command value signal and for outputting the command value signal; and
means for comparing the command value signal with the carrier wave to generate the control signal.

17. A power conversion method for a power converter, comprising:
generating a carrier wave;
changing a frequency of the carrier wave over time;
detecting a current from the inverter;
determining a polarity of the current;
compensating a command value in response to the frequency of the carrier wave as changed over time to obtain a command value signal wherein compensating the command value includes compensating the command value in accordance with the polarity of the current;
comparing the carrier wave changing over time with the command value signal;
converting a direct current voltage into an alternating current voltage by controlling switching devices to be turned ON and OFF based on a result of the comparing; and
outputting the alternative current voltage.

18. The power conversion method according to claim 17, further comprising:
compensating the command value in synchronization with a change in the frequency of the carrier wave.

19. The power conversion method according to claim 18, further comprising:
changing the frequency of the carrier wave such that the frequency of the carrier wave forms a periodic waveform.

* * * * *